(12) United States Patent
Mitake et al.

(10) Patent No.: US 8,319,474 B2
(45) Date of Patent: Nov. 27, 2012

(54) NON-CONTACT TYPE POWER FEEDER SYSTEM FOR MOBILE OBJECT

(75) Inventors: Masaya Mitake, Hiroshima (JP);
Katsuaki Morita, Hiroshima (JP);
Masahiro Yamaguchi, Hiroshima (JP);
Hiroshi Yamashita, Hiroshima (JP);
Masaomi Yamada, Mihara (JP);
Kousuke Katahira, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 241 days.

(21) Appl. No.: 12/674,298

(22) PCT Filed: Mar. 25, 2008

(86) PCT No.: PCT/JP2008/056276
§ 371 (c)(1),
(2), (4) Date: Jun. 9, 2010

(87) PCT Pub. No.: WO2009/118914
PCT Pub. Date: Oct. 1, 2009

(65) Prior Publication Data
US 2011/0187317 A1 Aug. 4, 2011

(51) Int. Cl.
*H02J 7/00* (2006.01)
*B60K 1/00* (2006.01)
*H01F 27/42* (2006.01)

(52) U.S. Cl. .... 320/109; 320/108; 180/65.1; 180/65.21; 307/104; 307/9.1; 307/10.1

(58) Field of Classification Search .................. 320/108, 320/109
See application file for complete search history.

(56) References Cited

U.S. PATENT DOCUMENTS
7,880,337 B2 * 2/2011 Farkas .......................... 307/104

FOREIGN PATENT DOCUMENTS
| JP | 59-171163 U | | 11/1984 |
| JP | 06-051419 U | | 7/1994 |
| JP | 06-066206 | * | 9/1994 |

(Continued)

OTHER PUBLICATIONS

Written Opinion of 201001003-1 dated Sep. 8, 2011.

(Continued)

*Primary Examiner* — Drew A Dunn
*Assistant Examiner* — Nathaniel Pelton
(74) *Attorney, Agent, or Firm* — Kanesaka Berner & Partners

(57) ABSTRACT

Provided is a noncontact type power feeder system for feeding an electric power to a mobile object, which enables a quick charge and transmission of a high electric power and in which a power feeder and a power receiver can be readily manufactured at low cost, comprising a power feeder arranged along a running road surface for the mobile object 1, and a power receiver mounted to the mobile object, the power feeder and the power receiver being opposed face-to-face to each other for feeding an electric power, wherein the power feeder is secured on the running road surface for the mobile object and characterized in that magnets are mounted to the upper surface of the power feeder which is accommodated in a recess formed in the running road surface and which is supported by resilient springs.

10 Claims, 15 Drawing Sheets

FOREIGN PATENT DOCUMENTS

| | | |
|---|---|---|
| JP | 06-066206 U | 9/1994 |
| JP | 09017667 | 1/1997 |
| JP | 10023689 A | 1/1998 |
| JP | 10092672 A | 4/1998 |
| JP | 2000152512 A | 5/2000 |
| JP | 2005269687 A | 9/2005 |
| JP | 2006121791 | 5/2006 |
| JP | 2006136150 | 5/2006 |

OTHER PUBLICATIONS

Japanese Office Action for Application No. 2006-309733 mailed Oct. 22, 2010.
Singapore Written Opinion for Application No. 201001003-1 mailed Nov. 11, 2010.
ISR for PCT/JP2008/056276 dated May 20, 2008.
IPRP for PCT/JP2008/056276 mailed Nov. 18, 2010.

* cited by examiner

Sectional view along line A - A

NON-CONTACT TYPE POWER FEEDER SYSTEM FOR MOBILE OBJECT

RELATED APPLICATIONS

The present application is national phase of, and claims priority from, International Application Number PCT/JP2008/056276, filed Mar. 25, 2008, the disclosure of which is hereby incorporated by reference herein in its entirety.

BACKGROUND OF THE INVENTION

1. Technical Field

The present invention relates to a power feeder system for feeding an electric power in a non-contact manner to a power receiver provided, for example, on a mobile object such as an electric car or an electric vehicle in a track type traffic system from a power feeder provided in a track such as a railway or a road surface on which the mobile object or the like runs.

2. Description of the Related Art

Heretofore, there have been developed a various kinds of non-contact type power feeder systems for feeding an electric power to an electrically driven mobile object in a non-contact manner. The non-contact type power feeding system is adapted to charge an electric power to a power receiver from a power feeder which faces the power receiver with a gap therebetween, in a non-contact type with the use of electromagnetic induction. A vehicle in a new traffic system or the like in which the vehicle runs on a predetermined pathway with rubber tires, indispensably utilizes the above-mentioned non-contact type power feeder system in order to materialize a feeder-lineless traffic system.

Patent Document 1 (Japanese Patent Laid-Open No. 2000-152512) discloses a charging system for charging a battery mounted on a vehicle such as an electric vehicle among a various kind of vehicles. This charging system incorporates a primary coupler provided in an underground accommodation space formed by digging the ground, and an elevating means for raising the primary coupler toward a secondary coupler mounted on a vehicle so that the primary coupler is projected from the accommodation space, above the ground.

Further, Patent Document 2 (Japanese Patent Laid-Open No. 2005-269687) discloses a non-contact type charging system for a vehicle. This system is adapted to electromagnetically couple a primary coil connected to an external electric power source, with a secondary coil connected to a power battery on a vehicle so as to charge the power battery, wherein the primary coil is installed in a plane substantially flush with a road surface on which the vehicle runs, at a position where the vehicle never runs, and is raised up to a position underneath the secondary coil mounted on the vehicle. With this configuration, the repair and inspection for the charging system can be made in a comfortable posture.

The non-contact type charging system disclosed in Patent Document 1 requires a relatively long operation time for raising the primary coupler provided in the underground accommodation space toward the secondary coupler. Accordingly, this system is unsuitable for such a tract type traffic system that a quick charge should be made, within a brief time, for a vehicle which stops at a station, that is, this system can be used appropriately only for an electric vehicle.

Further, the non-contact type charging system disclosed in Patent Document 2 also requires an operation for raising the primary coil up to a level underneath the secondary coil mounted to the bottom surface of the vehicle so as to require an extra time, correspondingly. In the track type traffic system, a quick charge is required within several ten seconds during stopping at a station. The longer the time for operating the secondary coil, the shorter the charging time, the power charging becomes insufficient.

Further, the primary coil and the secondary coil have not yet been miniaturized until now, and accordingly, they cannot be installed in a narrow space. If the gap between the power feeder and the power receiver becomes larger, no high electric power can be transmitted, that is, no large gap can be taken therebetween. Thus, vertical variation of the vehicle would causes such a risk that the power feeder and the power receiver make contact with each other. Further, since the primary coil inevitably utilizes a drive mechanism, there would be caused such a problem that the overall mechanism becomes more complicate.

SUMMARY OF THE INVENTION

Thus, the present invention is devised in view of the above-mentioned technical background, and accordingly, an object of the present invention is to provide a non-contact type power feeding system for feeding an electric power to a mobile object, which eliminates the necessity of a drive mechanism so as to simplify the overall mechanism, and which eliminates the necessity of a time for operating the drive mechanism so as to obtain a sufficient charging time. Further, another object of the present invention is to materialize the miniaturization of a power feeder and a power receiver so as to simplify the manufacture thereof in order to reduce the costs, and is to enable transmission of a large power even though the gap between the power feeder and the power receiver is large.

To the end, according to the present invention, there is provided a non-contact type power feeder system comprising a power feeder provided along a pathway for a mobile object, and a power receiver provided on the mobile object, for feeding an electric power from the power feeder to the power receiver which is opposed to the power feeder, face-to-face, the power feeder being secured on the road surface of the pathway on which the vehicle runs, or being secured aerially above the mobile object, and the power receiver being secured to a position where the power receiver is opposed to the power feeder face-to-face with a predetermined gap therebetween when the vehicle comes to a stop at a position where the power feeder is set up, the power feeder and the power receiver being composed of planar cores each having long sides laid along a traveling direction of the mobile object, and the power feeder being fed with an electric power through a feeder line laid underground or aerially.

According to the present invention, since the power feeder is secured to the road surface of the pathway for the vehicle, or is secured aerially above the pathway (secured to, for example, to the roof of a station building) while the power receiver is secured to the lower part or the upper surface of the roof of the mobile object, and since no mechanism for driving the power feeder or the power receiver, thereby it is possible to simplify the overall mechanism. Since the power feeder and the power receiver are secured, being positioned so as to enable the power feeder and the power receiver to be opposed face-to-face to each other with a predetermined gap therebetween when the mobile object comes to a stop at a position where the power feeder is set up, no mechanisms for driving them is required.

According to the present invention, since the power feeder and the power receiver are composed of planar cores each having long sides laid in the travel direction of the mobile object, the mobile object can be easily stopped at a position where the power receiver is opposed face-to-face to the power feeder, and further, even though the mobile objected comes to a stop at a position which is shifted more or less from the afore-mentioned position, the transmission of a power can be made sufficiently.

Further, the outer surface of the planar core can be formed with no difficulty in such a shape that it has long sides laid in the travel direction. Thus, a large-sized planar core having long sides which are long in the travel direction can be simply formed. The non-contact type power feeder system composed of the above-mentioned planar core can ensure the degree of freedom for designing a system for transmission of a larger power by adjusting the length thereof while the overall width of the planar core is decreased as possible as it can.

In the present invention, there may be provided a position detecting sensor for the mobile object, and an control unit receiving a positional information from the position detecting sensor, for stopping the mobile object at the position where the power receiver and the power feeder are opposed face-to-face to each other, thereby it is possible to stop the mobile object at a desired position.

Further, in addition to the above-mentioned configuration, there may be provided such a configuration that wheel stoppers for stopping the movement of a wheel of the mobile object, which are buried in the running road surface for the mobile object, and which are projected from the running surface when the mobile object comes to a position in the vicinity of the position where the power feeder and the power receiver are opposed face-to-face each other, and accordingly, a mechanical stopping function by the wheel stopper can be used in addition to the stopping function of the control unit, thereby it is possible to surely stop the mobile object at the position where the power feeder and the power receiver are opposed face-to-face to each other.

Further, in the present invention, the power feeder or the power receiver may be set so as to be movable to and away from each other so that the gap between the power feeder and the power receiver can be set to a desired value after the power feeder and the power receiver are opposed face-to-face with each other, and accordingly, the magnetic flux density to be applied to the power receiver can be increased, thereby it is possible to enhance the charging power.

For example, a magnet is attached to the upper surface of the power feeder which is buried in a recess formed in the running road surface for the mobile object and which is supported by a spring, and accordingly, the power feeder is held at a position which is below the running surface, by its dead weight, when the mobile object does not approach the power feeder, but is projected above the running surface by the attraction force effected between the magnet and the mobile object when the mobile object approaches the power feeder. With this configuration, the power feeder can be normally accommodated in the recess, and can be automatically projected upward without the necessity of any manipulation when the mobile object approaches, thereby it is possible to carry out charging with a high degree of efficiency. Further, since no drive mechanism therefor is required, it is possible to simplify the configuration, and to lower the costs.

Further, in the present invention, each of the power feeder and the power receiver is composed of windings formed in an oval-like shape, and a planar core made of a magnetic material and formed in its outer surface with a recess in which the windings are accommodated with its oval direction extending along the travel direction of the mobile object, the plate-like core being composed of a plurality of planar blocks having rectangular surfaces, which are arranged so as to extend their rectangular long sides in the travel direction, and which are laid in the travel direction or in a direction orthogonal to the travel direction, or which are superposed with each other up and down, the recess being defined by thick wall parts which are formed by superposing the planar blocks on the outer surface of the planar core on the inside and outside of the oval part of the windings. Specifically, the recess of the planar core corresponding to the oval part of the windings can be defined with such a configuration that a plurality of planar blocks having rectangular surfaces, are arranged in the travel direction or a direction perpendicular to the travel direction in such a condition that their rectangular long sides are laid in the travel direction, and the thick wall parts which are located on the outside and inside of the oval part of the winding are formed by superposing the planar blocks up and down.

In this case, the power feeder and the power receiver substantially have one and the same configuration. The power feeder is arranged on the running surface of the mobile object with its winding set-up surface being faced toward the mobile object side, and the power receiver is arranged at a position where it is opposed face-to-face to the power feeder with a predetermined gap therebetween when the mobile object comes to a stop at a charging position, with its winding set-up surface being faced toward the power feeder.

After the mobile object comes to a stop for charging at a position where the power receiver is opposed face-to-face to the power feeder, an AC current is fed to the primary windings of the power feeder so as to induce a magnetic flux having a main magnetic path passing through the gap between the power feeder and the power receiver.

The total magnetic flux is the sum of an effective magnetic flux which interlinks the secondary windings of the power receiver, and a leakage magnetic flux which does not interlink the same. Since the magnetic flux interlinking the secondary windings varies with time, an induced electromotive force is produced in the secondary windings through magnetic induction, and accordingly, an AC current runs therethrough so that an electric power is transmitted to a load connected to the secondary windings.

In the above-mentioned configuration, the planar core constituting the power feeder or the power receiver is formed by arranging a plurality of planar blocks having rectangular outer surfaces in the travel direction of the mobile object or a direction orthogonal to the travel direction or by superposing them up and down in such a condition that the rectangular long sides are laid in the travel direction.

Thus, by changing the configuration pattern of the planar blocks, the shape of the core can be variously changed into a desired shape. Further, by combining the planar blocks with one another, a planar core having a simple planar shape can be easily manufactured at low costs. Since the planar core substantially has a thin flat shape, it can be easily arranged in the space between a vehicle and its running road surface.

The windings are accommodated in the recess formed in the outer surface of the planar core, its oval direction being extended along the travel direction of the mobile object. The planar blocks may be joined to one another by an adhesive, insulating screws or the like. Further, in order to protect the power feeder arranged on the running surface for the mobile object against the external environment, the power feeder is accommodated in an insulating resin casing, and molten resin is molded into the box from thereabove so as to cover the power feeder with the resin, and is then solidified.

Further, since the planer block having rectangular surfaces are arranged with their long sides are extended in the travel direction of the mobile object, the outer surface of the planar core can be readily formed in such a rectangular shape that its long sides are extended in the travel direction. Accordingly, a large-sized planar core can be easily formed having larger long sides which are extended in the travel direction. Further, a non-contact type power feeder which is constituted with the above-mentioned planer core can ensure a degree of freedom for designing a high power transmission system by adjusting the length thereof in the travel direction of the mobile object while the overall width of the planer core is set to be as small as possible.

With the configuration as stated above, since a large size planer core can be readily formed, the gap between the power feeder and the power receiver can be set to be relatively large. That is, the gap can be set to be in a range from, for example, several millimeters to sever ten millimeters.

In the above-mentioned configuration, the planar core is preferably formed with U-like sectional shape parts, or particularly preferably formed with flattened U-like sectional parts (thin wall parts (recesses), in other words, such a sectional configuration that embankment-like thick wall parts are present at the short-side ends of the recess for accommodating the windings) for supporting the opposite end parts of the windings in the oval direction, as clearly understood from FIGS. 13 and 14, in order to enable the planar core to support the windings throughout its entire periphery thereof. With this configuration, the U-like sectional shape core is arranged in the magnetic path which has been an air space, and accordingly, the overall magnetic resistance can be decreased while the inductance can be increased. Thus, the magnetic flux density can be increased. The sectional area of the planar core can increased in the parts located outside of the recess so that the magnetic flux density can be decreased outside of the windings. Thus, since the density of magnetic flux which leaks around the core can be decreased, electromagnetic noise and affection by induction heating of metals therearound can be decreased. Further, with the provision of the U-like sectional parts at the opposite ends of the windings in its oval direction, the magnetic flux can be readily induced even in the opposite end parts of the windings in its oval direction, and accordingly, the inductance can be increased, thereby it is possible to transmit a high electric power.

In the above-mentioned configuration, if the opening width of the recess for accommodating the windings within the planar core is set to be equal to or larger than the gap between the power feeder and the power receiver, the magnetic resistance of a magnetic path from which leakage of magnetic flux occurs, can be increased, and accordingly, the magnetic coupling rate can be enhanced, thereby it is possible to transmit a high electric power.

Further, in the above-mentioned configuration, if the length of the power feeder which is extended along the travel direction of the mobile object is set to be longer than the length of the power receiver which is extended along the travel direction, it is possible to enhance the robustness of received electric power with respect to a horizontal shift of the stop position of the mobile object. Further, since it is not necessary to increase the length of the planar cored in the power receiver on the mobile object side, which is required to be lightweight and compact, the planar core can be shortened, thereby the power receiver can be lightweight and compact.

It is noted in the present invention that the system can be small-sized by feeding a high-frequency current of several kHz to several ten kHz to the power feeder, but the windings are preferably formed of Ritz wire which can restrain an increase in resistance and an increase in heat which are caused by the skin effect of the high-frequency current. The planar core according to the present invention may be made of a magnetic material such as ferromagnetic ferrite, silicon steel or the like. The silicon steel has a loss which is larger than that of the ferrite, but can be used in a relatively low frequency band. It is noted that an iron core is inappropriate since its generates eddy currents by a high frequency current so as to generate a heat.

According to the present invention in which the power feeder is secured on the running surface for the mobile object, or aerially above the running surface while the power receiver is secured to the mobile object at a position where the power receiver can be opposed face-to-face to the power feeder with a predetermined gap therebetween when the mobile object comes to a stop, no mechanism for driving the power feeder or the power receiver is present, thereby it is possible to simplify the overall mechanism.

Further, since the power feeder and the power receiver are composed of the planar cores having their long sides extended in the travel direction of the mobile object, the outer surfaces of the planar cores can be readily formed in rectangular shapes have their long sides extended in the travel direction.

Thus, a large-planar core can be easily formed having large long sides extended in the travel direction, and accordingly, the non-contact type power feeder system which is composed of the above-mentioned large-sized planar cores can ensure a degree of design freedom for transmission of a high electric power by adjusting the lengths of the planar cores in the travel direction of the mobile object while the overall width of the planar core is set to be small as possible. Since the planar cores are flat plate-like, they can be arranged in a narrow space between the movable object and the running road surface therefor.

DETAILED DESCRIPTION OF THE PREFERRED EMBODIMENT

Explanation will be hereinbelow made of preferred embodiments of the present invention in exemplified forms with reference to the accompanying drawings. It is noted that dimensions, materials and shapes of components explained in these embodiments, and as well, relative positions of them should not be intended to limit the technical scope of the present invention thereby unless otherwise specified.

Embodiment 1

A first embodiment of the present invention will be explained with reference to FIGS. 1 to 5C.

Figure 1:
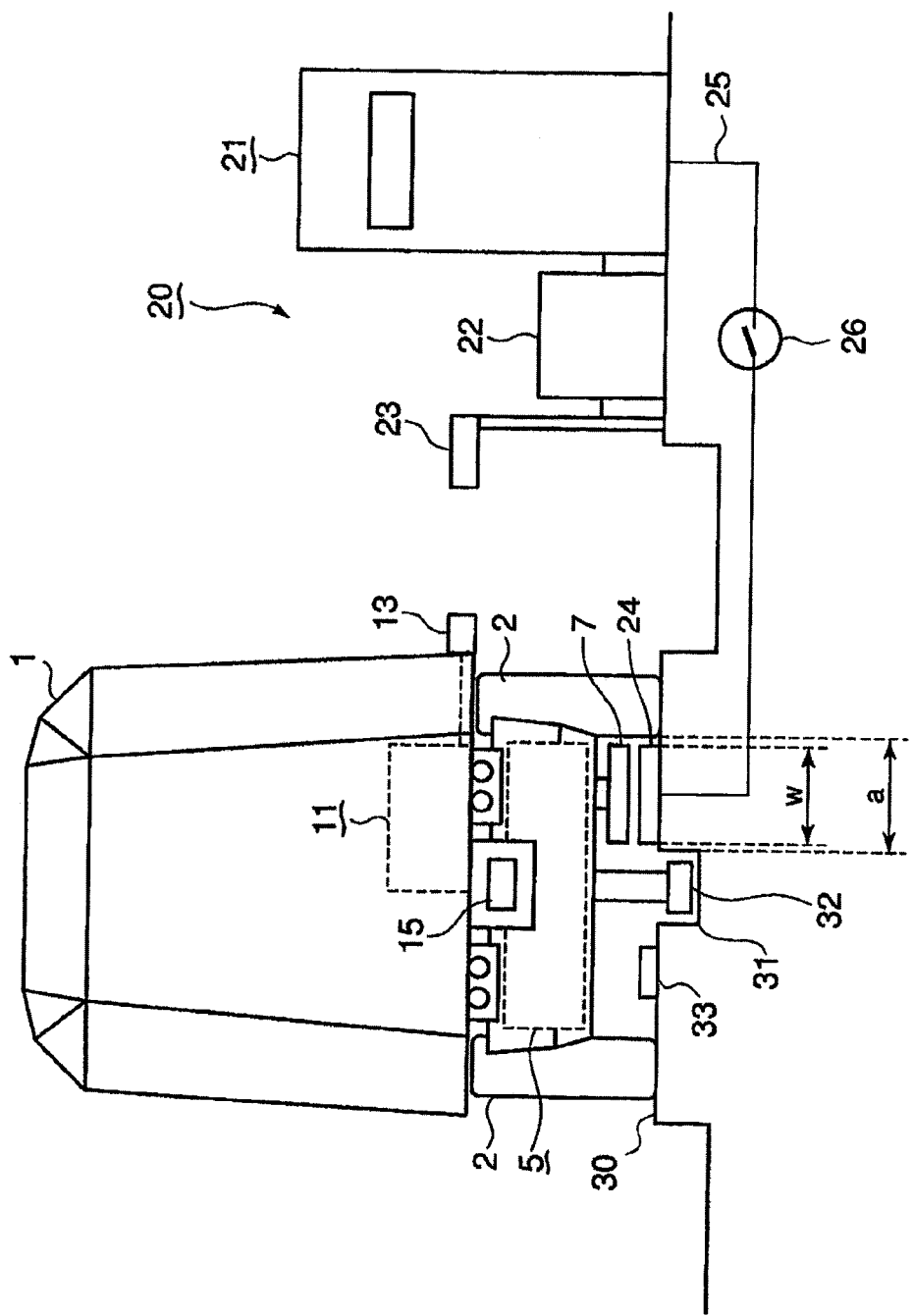
FIG. 1 is an elevation view illustrating a configuration of a first embodiment in which the present invention is applied in a track type traffic system.

Referring to FIG. 1, a vehicle 1 in a track type traffic system is an electric vehicle which is equipped with rubber tires 2 as wheels at four corners of the bottom of the vehicle, and adapted to run on a predetermined track (a running road surface 30 in this embodiment) under electric power.

Figure 2:
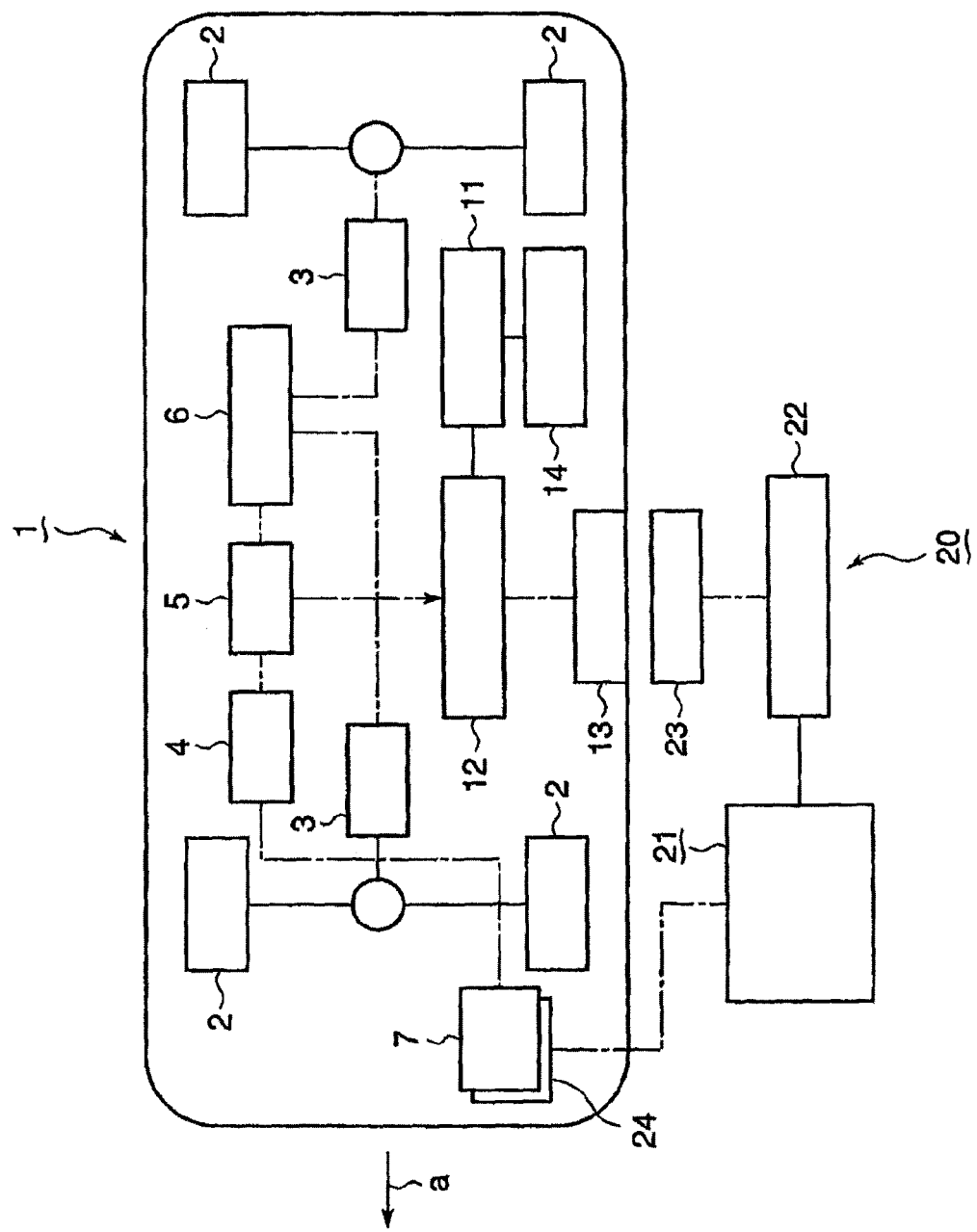
FIG. 2 is a plan view illustrating the configuration of the first embodiment.
Figure 3:
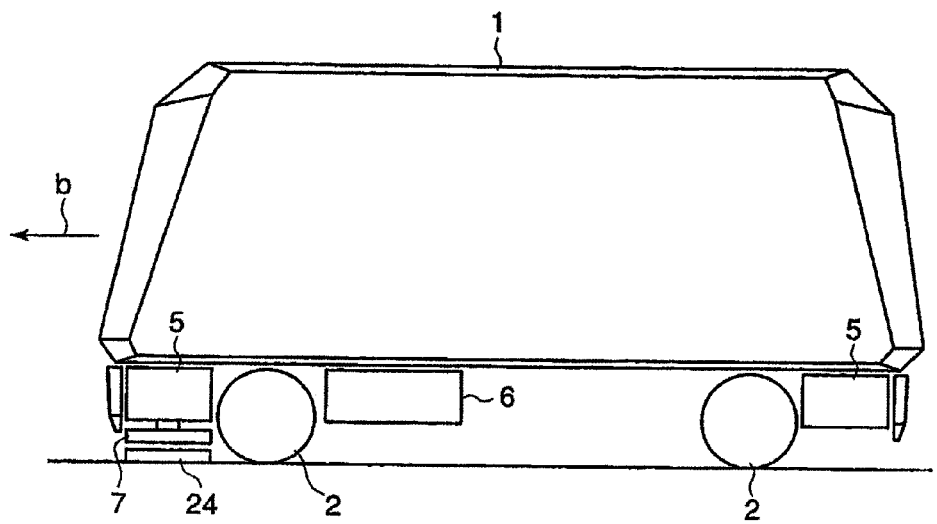
FIG. 3 is a side view illustrating a vehicle in the first embodiment.
Figure 4:
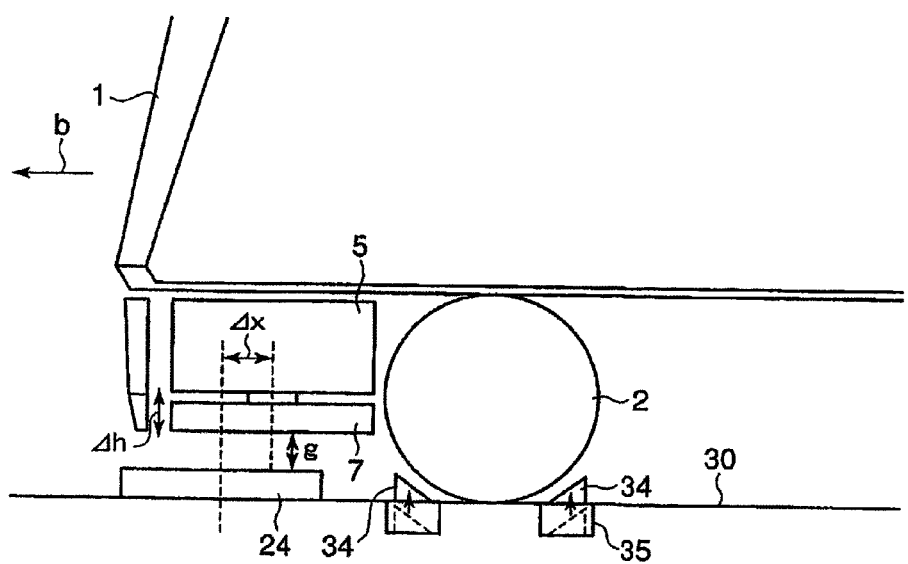
FIG. 4 is an enlarge view illustrating a part shown in FIG. 3.

Referring to FIG. 2, the vehicle 1 incorporates motors 3 for driving the rubber tires 2, a secondary storage cell (for example, a lithium ion secondary storage cell) 5 for feeding drive currents to the motors 3, and a controller 6 for controlling the motors 3. A power receiver 7 is provided in a front lower part of the vehicle 1, and an electric motive force induced in the power receiver 7 is converted by a rectifier 4 into a DC current which is then charged in the secondary storage cell 5.

Further, the vehicle 1 is mounted therein with a vehicle control unit 11 for controlling the running of the vehicle 1 and as well controlling the other all components of the vehicle, and accordingly, for example, the control unit 11 carries out such control that the vehicle 1 is stopped at a desired position in response to a position of the running vehicle 1 detected by a position sensor 14.

Further, the vehicle 1 is equipped with an onboard charge control unit 12, an onboard communication unit 13 and the position sensor 14 for detecting a position of the running vehicle 1. Meanwhile, a ground charging equipment 20 which is equipped with a charging power source 21, a ground charge control unit 22 and a ground communication unit 23 is placed in a charging place on the ground (within, for example, a station yard).

The onboard communication unit 13 and the ground communication unit 23 are communicated with each other by infrared light so as to exchange information between the onboard communication unit 13 side and the ground side.

Figure 6:
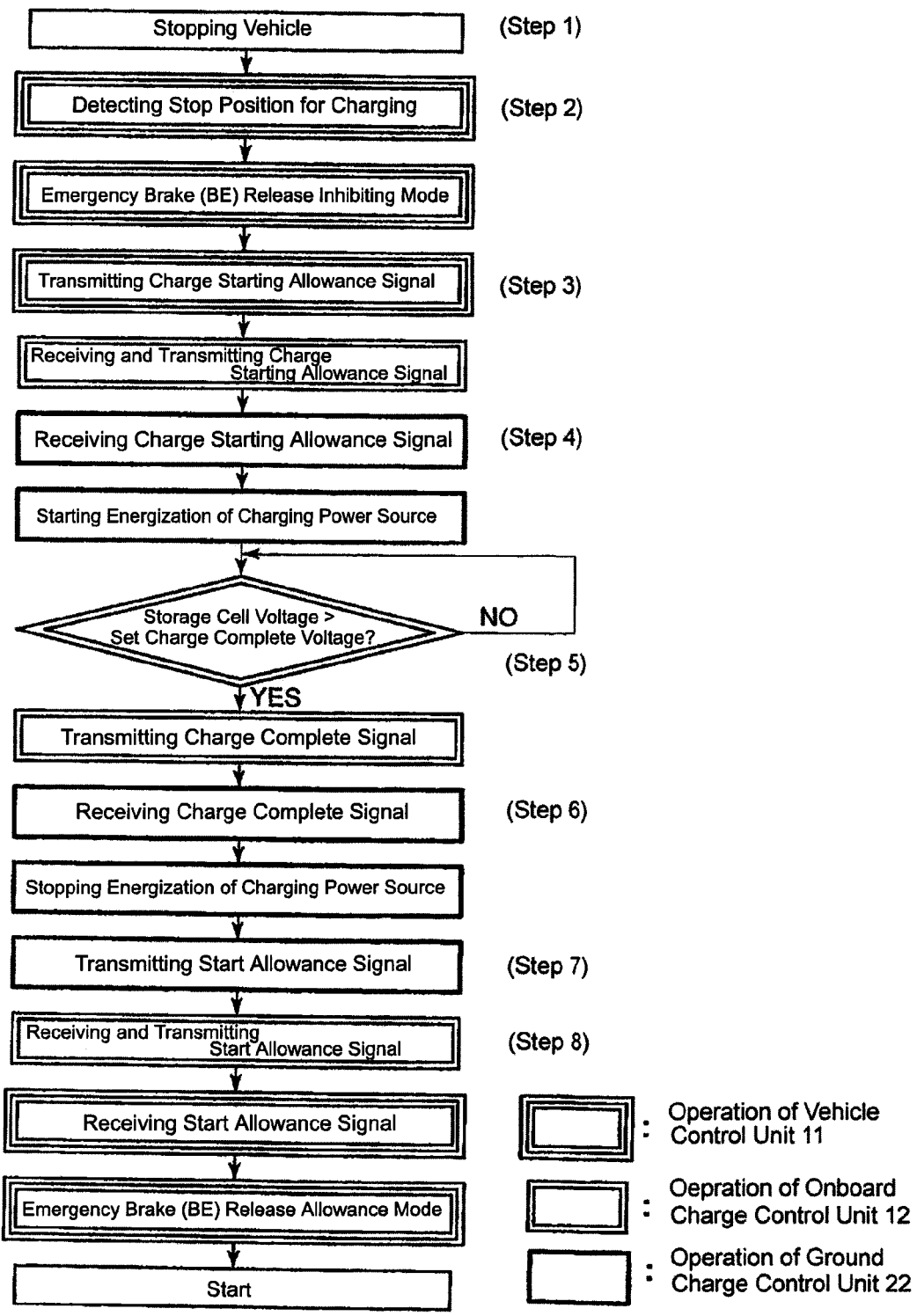
FIG. 6 is a flowchart for explaining charging steps in the first embodiment.

The onboard charge control unit 12 is equipped with a charge completion voltage setting means and a means for comparing a detected value of a voltage of the secondary storage cell 5 detected by a voltage detecting means, with a set charge complete voltage, and is adapted to carry out process steps shown by double line frames in a flowchart in FIG. 6.

Referring to FIG. 1, a guide groove 31 is formed in the center part of the running road surface 30 along a running direction, and a guide wheel 32 mounted to a vehicle bogie is inserted in the guide groove 31 during running of the vehicle 1.

The guide wheel 32 has a function of steering the vehicle 1, which is carried out by the guide wheel 32 guiding the vehicle 1. Alternatively, the guide wheel serves as a fail-safe mechanism for preventing the vehicle from running away from the track when an automatic steering mechanism for steering the vehicle 1 in a normal condition incorporated in the vehicle 1 malfunctions, or when the vehicle 1 is disturbed by any cause. It is noted that reference numeral 15 denotes a coupler provided at one end of the vehicle 1.

Brief explanation of the above-mentioned fail-safe mechanism will be made. This fail-safe mechanism is applied in a vehicle in a track type traffic system, which incorporates an automatic steering mechanism. The automatic steering mechanism receives the instant vehicle position data which exhibits a calculated vehicle position and which has been obtained by supplementing ground position data and distance between probes which are transmitted from several ground probes laid at predetermined intervals along the track, with GPS (Global Position System) data, pulse signals indicating a revolution speed of a tire, pulse signals indicating speeds of the drive motors, and the like. With the use of the data, the vehicle position is detected, and is compared with running track data stored in a storage portion so as to determine a steering pattern for automatic steering.

However, the above-mentioned automatic steering is insufficient if no mechanical steering measures replying upon a guide wheel, a guide rail and the like is provided. That is, it is required to ensure a safety countermeasures against run-away or derailing of the vehicle upon emergency caused in the case of a failure of the above-mentioned automatic steering mechanism, or in the case of environmental disturbance such as a wind, a rain or a snow.

Thus, the following fail-safe mechanism is incorporated for ensuring a safety. That is, a groove-like protection track is formed along the track, and accordingly, a protection wheel provided to the lower part of the vehicle bogie is inserted in the protection track while the vehicle is running. The protection wheel has a gap between the protection track, that is, the vehicle runs without the protection wheel making contact with guide walls of the protection track. This gap is set to be smaller than an allowable limit with which the vehicle comes off from the track.

With the above-mentioned fail-mechanism, when the automatic steering mechanism malfunctions, or when the vehicle 1 is disturbed, the protection wheel makes contact with the protection track so as to steer the vehicle. Thus, the vehicle can be safely protected even if the steering mechanism in the vehicle fails, or if any disturbance is applied to the vehicle (refer to Japanese Patent Laid-Open No. 2006-175962 for detail).

Referring to FIG. 1, a signal line 33 for transmitting various signals from the ground side to the vehicle 1 is placed on the running road surface 30. A ground power feeder 24 is placed on the running road surface 30 between the right rubber tires 2 and the guide groove 31, and is connected to the charging power source 21 by way of a switch 26 through the intermediary of a power feed line 25. The ground power feeder 24 which is placed on the running road surface 30 has a width W which is smaller than the width a (for example, 600 mm) between the right rubber tires 2 and the guide groove 31.

Next, explanation of the configurations regarding the ground power feeder 24 and the onboard power receiver 7 will be made with reference to FIGS. 5A to 5C in which the configuration of the ground power feeder 24 is substantially identical with that of the onboard power receiver 7, that is, it is composed of an E-like core 43 and windings 44. The E-like core 43 is composed of a plurality of planar blocks 45 which are made of ferromagnetic ferrite and which are suitably arranged in the travel direction b of the vehicle or in a direction orthogonal to the travel direction b, or are superposed with each other up and down, adjacent planer blocks 45 being joined to each other by an adhesive or insulating screws. The ground power feeder 24 and the onboard power receiver 7 in this embodiment are each composed of planar blocks 45 in the number of 48. These planar blocks 45 are readily and commercially available as standard components at low costs.

The planar blocks 45 are flat plate-like forming rectangular surfaces. Every planar block 45 is laid so that long sides 45a thereof are extended in the travel direction b, and short sides 45b thereof are extended in a direction orthogonal to the travel direction b. Thus, the ground power feeder 24 or the onboard power receiver 7 is formed from flat plate-like members having rectangular surfaces with their long sides being extended in the travel direction b, and accordingly, it is preferable. It is noted in FIG. 5B, that two of the planar blocks are superposed with each other so as to form protrusions 47 in the hatched parts.

The windings 44 are formed in an oval shape, are accommodated in a recess 48 defined between the protrusions 47 (the hatched parts) of the E-like core 43, the direction of the oval shape being extended in the travel direction b. A gap 46 is provided for forming radii of curvature in the windings, at the corners of the planar blocks.

The ground power feeder 24 and the onboard power receiver 7 having configuration as stated above are opposed face-to-face to each other with a gap g therebetween, as shown in FIG. 5C, in order to constitute the non-contact type power feeder system. The onboard power receiver 7 is mounted to the vehicle 1 at a position where it is opposed face-to-face to the ground power feeder 24 with the gap g therebetween, in parallel therewith, when the vehicle comes in the travel direction, up to a position right above the ground power receiver 24.

When the vehicle 1 comes to a charging position where the onboard power receiver 7 is opposed face-to-face to the ground power feeder, an AC current is fed to the primary windings 44a in the ground power feeder 24 so as to induce a magnetic flux through the gap g, as a main magnetic path, between the primary core 43a of the ground power feeder 24 and the secondary core 43b of the onboard power receiver 7. The AC current is a high frequency current in a range from several kHz to several ten kHz which can increase the magnetic flux density, resulting in miniaturization of the cores. The total magnetic flux is the sum of an effective magnetic flux interlinked with the secondary windings 44b of the onboard power receiver 7 and a leakage magnetic flux which is not interlinked with the secondary windings 44b. The magnetic flux interlinked with the secondary windings 44b varies with time, and accordingly, an electromotive force is induced in the secondary windings 44b through electromagnetic induction, and accordingly, an AC current runs through the secondary windings 44b. Thus, an electric power is transmitted to a load connected to the secondary windings 44b.

With the ground power feeder 24 and the onboard power receiver 7 configured as stated above, a large size E-like core 43 can be formed at low costs, by combining a plurality of planar blocks 45.

Further, since they having a simple and thin planar shape, they can be easily inserted between a narrow space between the vehicle 1 and the running road surface 30. Further, the planar blocks 45 are arranged with their long sides 45a being extended in the travel direction b, and the oval direction of the windings is set to the travel direction b. Thus, the E-like core 43 can have a long length in the travel direction b, and accordingly, it has a narrow width in a direction orthogonal to the travel direction b, thereby it is possible to enhance the degree of freedom for the arrangement and dimensional design of components.

Since a large-sized core can be readily formed, a high electric power can be transmitted between the ground power feeder 24 and the onboard power receiver 7 through a large gap g therebetween. Further, since the gap g can be set to be larger, even though the position where the vehicle 1 comes to a stop is horizontally shifted by $\Delta x$ in the travel direction b from the ground power receiver 24, a high electric power can be transmitted. Further, even though the gap g varies more or less, the inductance does not vary appreciably, thereby it is possible to transmit a high electric power.

In the first embodiment as stated above, the vehicle 1 comes to a stop at the ground charging equipment 20 in a station building or the like in order to carry out charging. At this stage, the vehicle control unit 11 controls the vehicle 1 while the position of the instant vehicle 1 is detected by the position sensor 14 in order to stop the vehicle 1 at the position where the onboard power receiver 7 mounted to the bottom part of the vehicle 1 is located right above the ground power feeder 24 provided on the running road surface 30. At this time, the ground charge control unit 22 detects the onboard power receiver 7 which is located in the vicinity of the position right above the ground power feeder 24, and projects wheel stoppers 34 from a recess 35 formed in the running road surface 30, before and after the stop positions of the rubber tire 2. The drive mechanism for the wheel stoppers has been conventionally known, that is, for example, it may be composed of the electric cylinder and a link mechanism in combination.

Thus, with the use of both stopping control by the vehicle control unit 11 and mechanical stopping operation by the wheel stoppers, the vehicle 1 can surely be stopped at a position where the onboard power receiver 7 is located right above the ground power feeder 24.

Further, a convenient drive unit for displacing the onboard power receiver 7 up and down, is provided for finely adjusting the gap between the onboard power receiver 7 and the ground power feeder 24. This drive unit may be convenient and conventionally well-known. For example, there may be used such a mechanism that screws by which the onboard power receiver 7 is supported are rotated so as to move the onboard power receiver 7 up and down. Thus, the smaller the gap between the onboard power receiver 7, the higher the magnetic flux density, the charging electric power can be increased. The gap between the onboard power receiver 7 and the ground power feeder 24 can be set to a small value by the above-mentioned mechanism.

It is noted that the gap g between the onboard power receiver 7 and the ground power feeder 24 is set to a value which is larger than a vertical variation Ah of the vehicle 1 in view of such assumption that the load of the vehicle varies or a rubber tire punctures. For example, the gap g is set to a value in a range from about 50 to 70 mm.

In view of the configuration of this embodiment, the charging operation will be explained with reference to FIG. 6 in which triple line frames exhibit process steps performed by the vehicle control unit 11 while double line frames exhibit process steps performed by the onboard charge control unit 12, and single line frames exhibit process steps performed by the ground charge control unit 22. At first, the vehicle 1 comes to a stop at a predetermined charge allowable position, that is, a position where the onboard power receiver 7 is opposed face-to-face to the ground power receiver 24 without making contract thereto, while the position of the vehicle 1 is detected by the position sensor 14 (Step 1).

It is noted that there may be used such measures that the position of the vehicle 1 can be detected through the communication between the onboard communication unit 13 and the ground communication unit 23, instead of using the position sensor 14.

Next, after the vehicle 1 which has come to a stop at the charging position is detected by the position sensor 14 or through the communication between the onboard communication unit 13 and the ground communication unit 23, the vehicle control unit changes over the vehicle 1 into an emergency brake (EB) release inhibiting mode so as to hold the vehicle 1 in such a condition that the emergency brake is exerted in order to prevent the vehicle from starting (Step 2).

Next, the vehicle control unit 11 delivers a charge allowance signal to the charge control unit 22 through the intermediary of the vehicle charge control unit 12 (Step 3), and accordingly, the ground charge control unit 12 receives this signal (Step 4).

Next, the charging is started by the charging power source 21 (Step 5). When charging of the onboard secondary storage cell 5 is started, the vehicle charge control unit 12 compares a charged voltage of the secondary storage cell 5 with a set value of a preset charge completion voltage, and if the charge voltage of the secondary storage cell which is gradually increased becomes higher than the set value, the vehicle charge control unit 12 delivers a charging completion signal to the ground charge control unit 22 through the intermediary of the onboard communication unit 13, and when the ground charge control unit receives the charging completion signal (Step 6), charging to the vehicle 1 by the charging power source 12 is stopped.

Next, a vehicle start allowance signal is transmitted from the ground charge control unit 22 to the vehicle charge control unit 12 (Step 7), and is received by the vehicle control unit 11 through the intermediary of the vehicle charge control unit 12 (Step 8). Next, the vehicle control unit 11 changes over the present mode into an emergency brake (EB) release allowance mode, and the vehicle 1 is thereafter started.

According to the first embodiment, as stated above, in which the ground power 24 is secured to the running road surface 30 for the vehicle 1 while the onboard power receiver 7 is secured to the vehicle 1, and no mechanism for driving the ground power feeder 24 or the onboard power receiver 7 is provided, the overall mechanism can be simplified. Further, since the ground power feeder 24 and the onboard power receiver 7 are secured, the number of process steps for the charging can be reduced, and the time of charging can be prolonged while a quick charge can be made.

Further, since the vehicle 1 incorporates the position sensor 14 for detecting a position of the vehicle 1, and the vehicle control unit 11, the vehicle can be stopped precisely at a position where the ground power feeder 24 and the onboard power receiver 7 are opposed face-to-face to each other.

Further, since there may be provided a mechanical stopping mechanism composed of the wheel stoppers 34, the vehicle 1 can be stopped surely at a position where the ground power feeder 24 and the onboard power receiver 7 are opposed face-to-face to each other. Further, after the vehicle 1 comes to a stop, the gap between the ground power feeder 24 and the vehicle power receiver 7 can be reduced since the power feeder 24 can be moved by a convenient mechanism, and accordingly the magnetic flux density can be increased, thereby it is possible to enhance the charging efficiency.

Further, according to this embodiment, a planar core having a desired shape can be easily manufactured at low costs by combining the planar blocks 45. Since the planar core is flat plate-like, it can be easily laid between the bottom part of the vehicle 1 and the running road surface 30. Further, since the planar blocks 45 are arranged so as to extend its long sides 45a in the travel direction b, and since the oval direction of the windings 44 is directed in the travel direction b, the E-like core can have a long length in the travel direction b, and accordingly, a high electric power can be transmitted. Thus, the width W of the E-like core can be reduced in a direction orthogonal to the travel direction b, and accordingly, it is possible to enhance the degree of freedom for the arrangement and the dimensional design of the components. Further, since the gap g can be set to be larger, the width W of the ground power feeder 24 can be set to be smaller than the gap a between the rubber tires 2 and the guide groove 31.

Since the large size core can be easily formed as stated above, a high electric power can be transmitted even though the gap g between the ground power feeder 24 and the onboard power receiver 7 is set be large. Further, since the gap g can be set to be larger, even though the stopping position of the vehicle 1 is shifted in the travel direction b from the ground power feeder 24, a high electric power can be transmitted. In other words, even though the gap g varies more or less, the inductance can be prevented from being greatly changed, thereby it is possible to transmit a high electric power.

Further, the vehicle which is located at a charging allowance position is detected by the position sensor 14 or through the communication between the onboard communication unit 13 and the ground communication unit 23 so as to change over the vehicle 1 into the emergency brake (EB) release inhibiting mode, it is possible to prevent the vehicle 1 from being started during the charging.

Since the vehicle 1 is stared when the vehicle control unit 11 receives a charge complete instruction from the vehicle charge control unit 12 after the ground charge control unit 22 ceases the energization of the charging power source 21 upon completion of the charging, it is possible to prevent the vehicle 1 from starting before the completion of charging.

Figure 7:
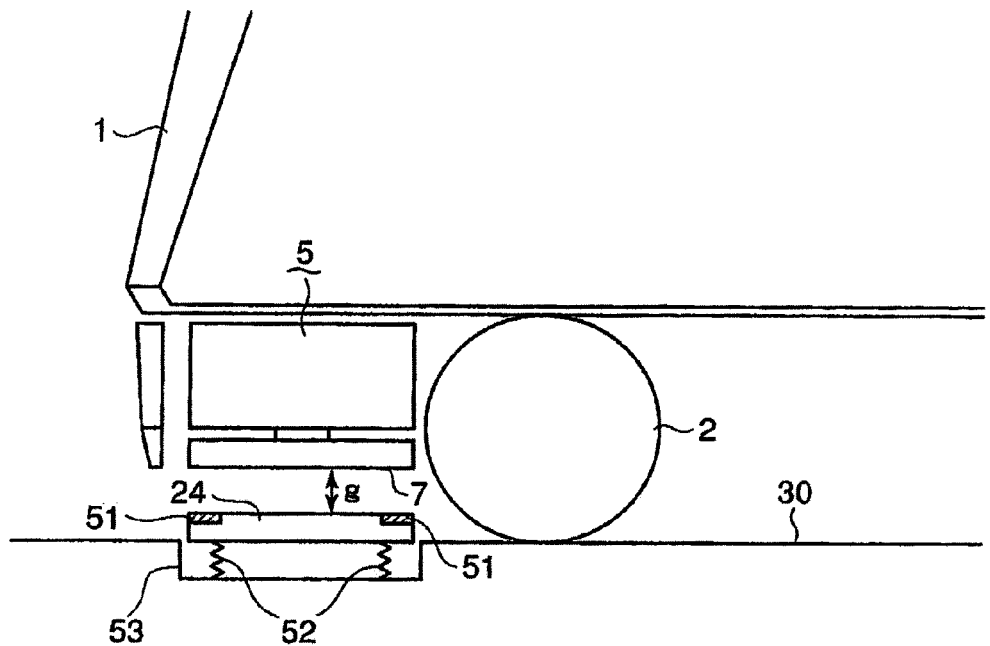
FIG. 7 is a partly enlarged side view illustrating a variant form of the first embodiment.

It is noted that although the onboard power receiver 7 is movable up and down in this embodiment, the ground power feeder 24 may be instead set to be movable up and down. That is, FIG. 7 is an enlarged side view which shows a movable ground power feeder 24 as such. Referring to FIG. 7, a recess 53 for accommodating the ground power feeder 24 is formed in the running road surface 30, and the ground power feeder 24 is accommodated in the recess 53. The ground power feeder 24 is supported by springs 52 attached to the bottom surface of the recess 5. However, the springs 52 are weak, that is, the dead weight of the ground power feeder 24 overcomes the resilient forces of the springs 52, and accordingly, the ground power feeder 24 is retained within the recess 53 before the vehicle 1 approaches. Further, permanent magnets 51 are attached to the upper surface of the ground power feeder 24.

When the vehicle 1 approaches the ground power feeder 24 so that the onboard power receiver 7 is opposed to the ground power feeder 24, right above the latter, the permanent magnets 51 produce magnetic forces for attracting the onboard power receiver 7, and accordingly, an upward force is applied to the ground power feeder 24. Thus, the magnetic forces and the resilient forces of the spring 52 overcome the dead weight of the ground power feeder 24, and therefore, the ground power feeder 24 is projected upward. Thus, the gap between the ground power feeder 24 and the onboard power receiver 7 is narrowed, thereby it is possible to enhance the charging effect. Further, the above-mentioned movable system does not require any drive unit, and accordingly, can be assembled at low costs.

Embodiment 2

Figure 8:
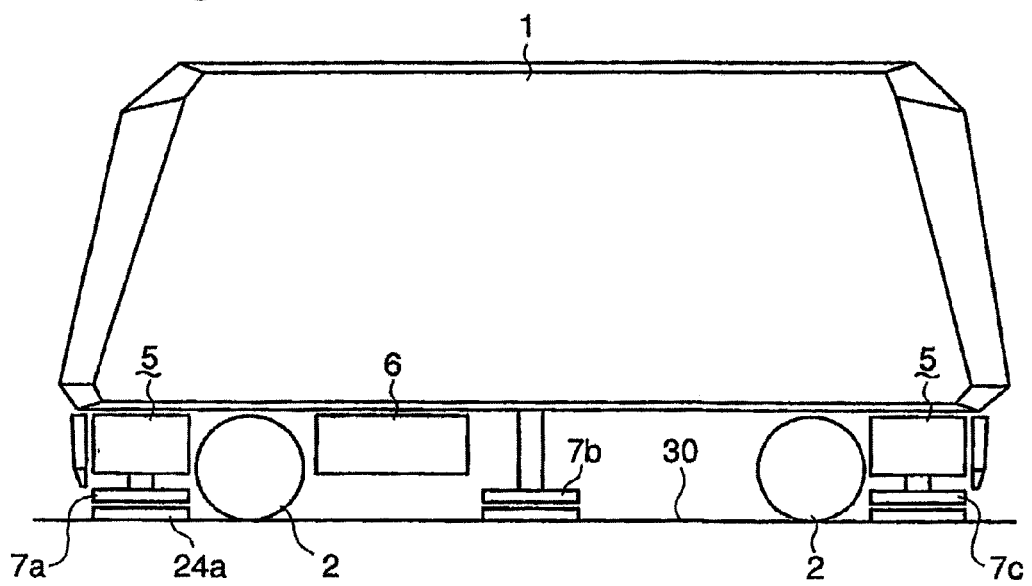
FIG. 8 is a side view illustrating a configuration of a second embodiment of the present invention.

Next, explanation will be made of a second embodiment of the present invention with reference to FIG. 8 which is a side view illustrating a configuration of a vehicle in a track type traffic system in the second embodiment. Referring to FIG. 8, like reference numerals are used to denote parts having structures like to that of those explained in the first embodiment as stated above. These are also applied all subsequent figures which will be explained hereinbelow. In this embodiment, onboard power receivers 7a, 7b, 7c are arranged in three parts, such as the front, middle and rear parts of the vehicle 1, respectively, and ground power receivers 7a, 7b, 7c are provided on a running road surface 30 at three positions which are opposed face-to-face to the three onboard power receivers 7a, 7b, 7c of the vehicle 1 which has come to a stop. The onboard power receivers 7a, 7b, 7c are flat plate-like as explained in the first embodiment, and they can be easily arranged at places between onboard components such as a secondary storage cell 5 and a controller 6, and the running road surface 30.

According to this embodiment, the charging can be simultaneously made with the use of a plurality of non-contact type power feeder systems, and accordingly, a quick charge can be made during a stop of the vehicle at a station or the like where the charging time is limited.

Embodiment 3

Figure 9:
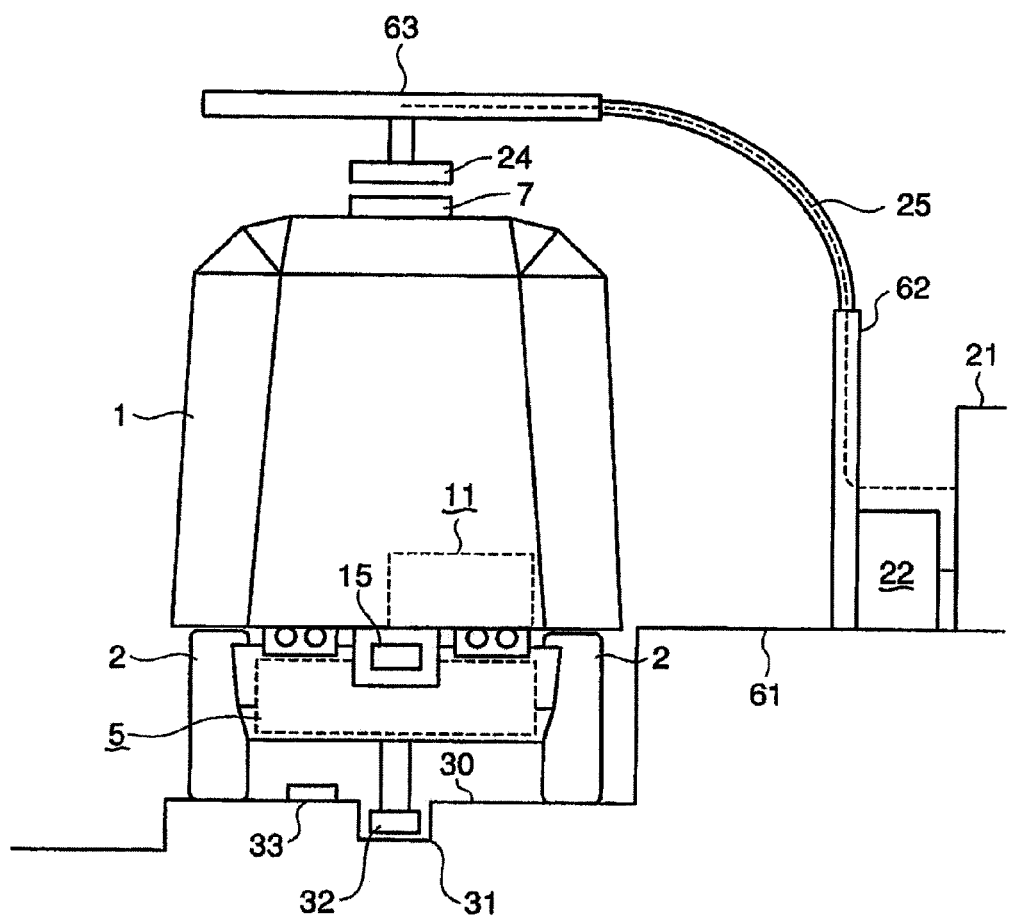
FIG. 9 is an elevation view illustrating a configuration of a third embodiment of the present invention.

Next, explanation will be made of a third embodiment of the present invention with reference to FIG. 9 which is an elevation view illustrating a configuration of a vehicle stopped in a station or the like. Referring to FIG. 9, a ground power feeder 24 is provided onto a roof 63 which is supported by a support column 61 standing upright on a platform 61 in the station or the like. A power feed line 25 connected to a charging power source 21 is laid through the insides of the support column 62 and the roof 63, and is connected to the ground power feeder 24 through the intermediary of a ground charge control unit 22.

Meanwhile, a vehicle power receiver 7 which is provided on the upper surface of the roof of the vehicle is opposed face-to-face to the ground power feeder 24 with a predetermined gap therebetween when the vehicle 1 comes to a stop at the platform 61. In this embodiment, since the onboard power receiver 7 is flat plate-like, as stated above, it is easily mounted on the roof of the vehicle 1. It is noted that a plurality of onboard power receivers may be arranged in the longitudinal direction of the vehicle 1 as explained in the first embodiment.

According to this embodiment in which a non-contact type power feeder system composed of the ground power feeder 24 and the onboard power receiver 7 is laid above the roof of the vehicle 1, it is not necessary to arrange the non-contact type power feeder system in a narrow space in the bottom part of the vehicle. Accordingly, an extra mounting space can be obtained in the bottom part of the vehicle 1. Thus, it is possible to use this space for accommodating other components. Further, the ground power feeder 24 can be set up with the use of the roof of a station building or the like, thereby it is possible to eliminate the necessity of the provision of a special ground equipment.

Further, the noncontact type power feeder system can be laid on the roof of the station building which is hardly accessible by a person, that is, an aerial magnetic field can be created, remote from a person, it is possible to enhance the safety.

Embodiment 4

Figure 10:
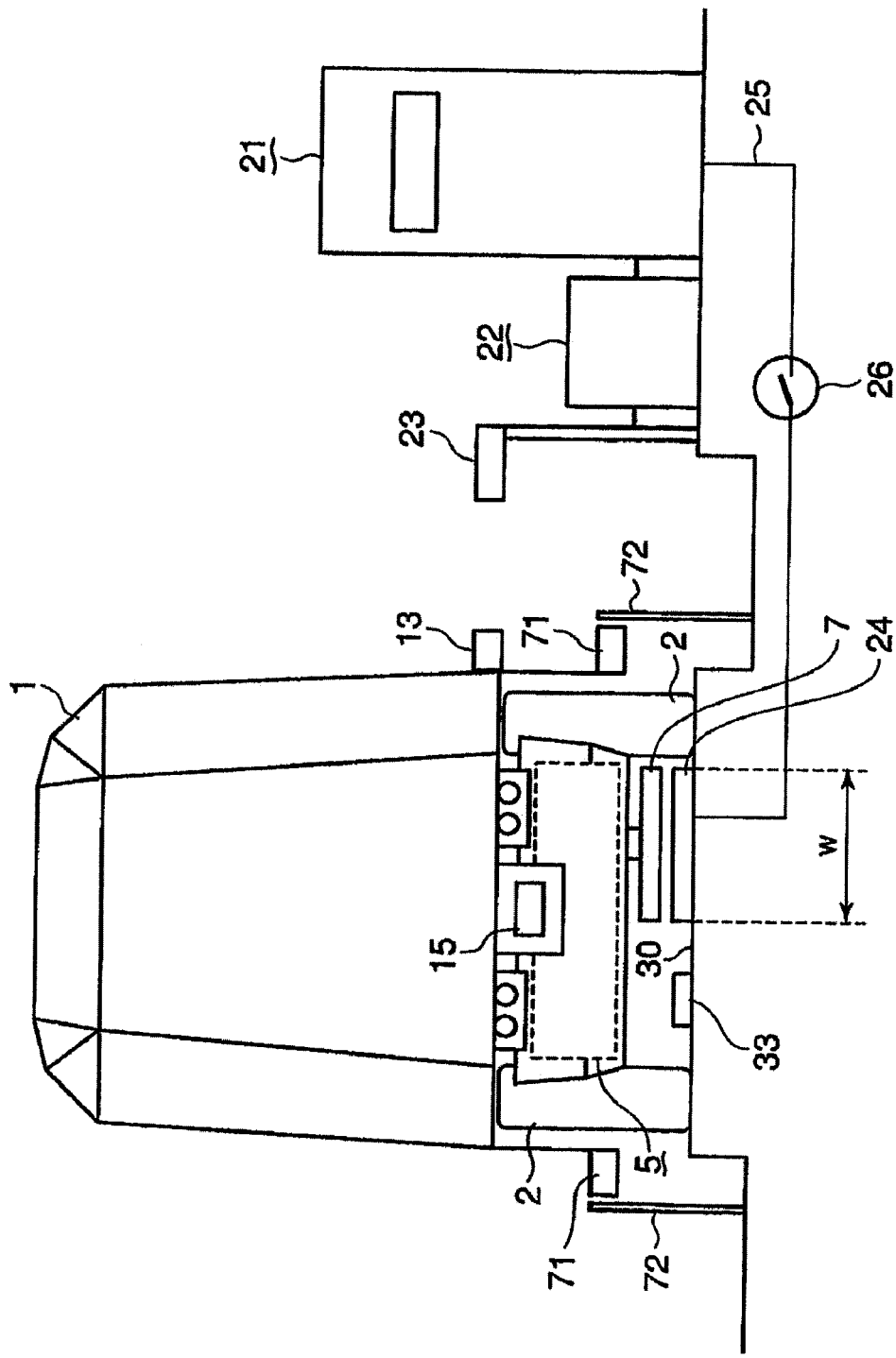
FIG. 10 is an elevation view illustrating a configuration of a fourth embodiment of the present invention.

Next, explanation will be made of a fourth embodiment of the present invention with reference to FIG. 10 which is an elevation view which shows a configuration of a vehicle which is stopped in a charging place. Referring to FIG. 10, the present invention is applied in a track type traffic system having a side guide configuration. Guide walls 72 are laid on opposite sides of a running road surface 30 for the vehicle 1, being extended along the running road surface 30, and guide wheels 71 mounted to the opposite sides of the vehicle 1 are guided by the guide walls 71 so as to steer the vehicle 1.

In the track type traffic system having the side guide configuration, an onboard power receiver 7 is provided in the bottom part of the vehicle 1, and a ground power feeder 24 is set up on the running road surface 30 at a position where the it is opposed face-to-face to the onboard power receiver 7. In this embodiment, since there is no guide groove as in the first embodiment and the third embodiment, in the center part of the running road surface 30, the ground power feeder 24 can have a large width W. Further, if the position where the signal line is laid is shifted toward the left side rubber tires 2, the width W of the ground power feeder 24 can be set to be larger. Thus, a high electric power can be transmitted from the ground power feeder 24 to the onboard power receiver 7, and as well, the gap between the ground power feeder 24 and the onboard power receiver 7 can be set to be larger. Thus, large allowances for variation in the height of the vehicle 1 and positional shifts upon stopping of the vehicle can be obtained.

Embodiment 5

Figure 11:
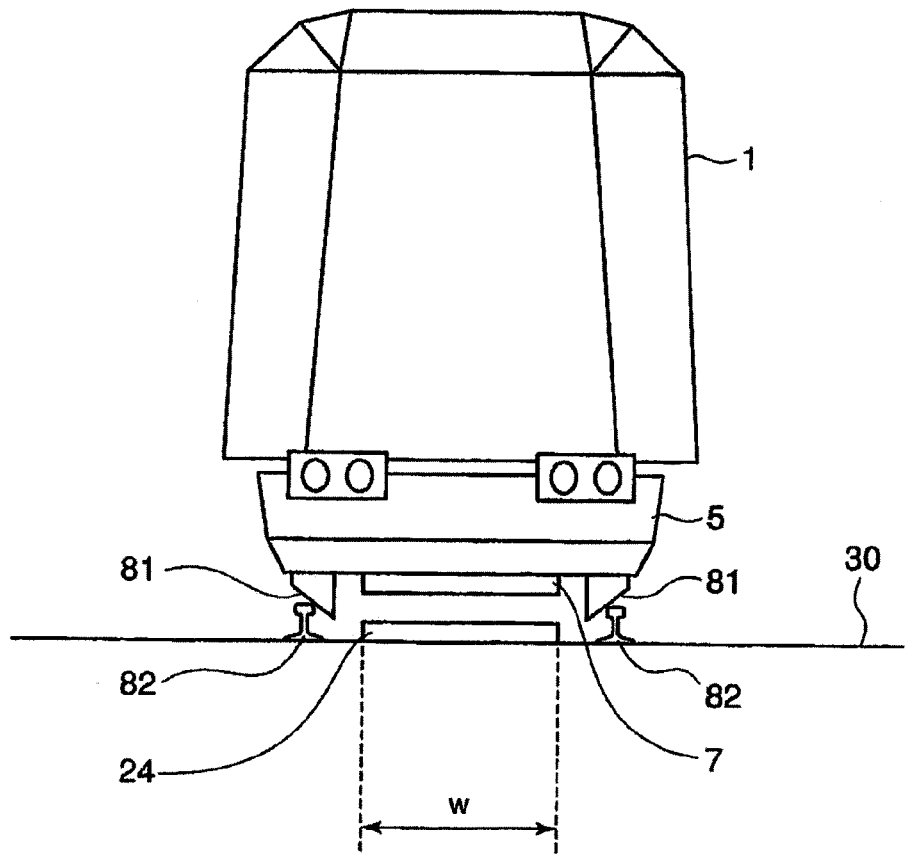
FIG. 11 is an elevation view illustrating a configuration of a fifth embodiment of the present invention.

Next, explanation will be made of a fifth embodiment of the present invention with reference to FIG. 11 which is an elevation view illustrating a configuration of a vehicle in the fifth embodiment of the present invention. Referring to FIG. 11, this embodiment concerns a vehicle having steel wheels 81 and running on rails 82d, such as an electric car or a tram car. In this embodiment, an onboard power receiver 7 is provided in the bottom part of a vehicle bogie, and a ground power feeder 24 is set up on a road surface between rails 82. It is noted in this embodiment that a plurality of noncontact type power feeder systems each composed of the onboard power receiver 7 and the ground power feeder 24 may be provided in the longitudinal direction of the vehicle 1, as stated in the second embodiment. Further, the onboard power receiver 7 may provided on the roof of the vehicle 1, as stated in the third embodiment while the ground power feeder 24 is provided to the lower surface of a roof for shielding the vehicle 1.

According to this embodiment, there may be obtained a space for mounting the onboard power receiver 7 over the overall width between the steel wheels 81 of the vehicle 1, and a space for setting up the ground power feeder 24 over the width between the rails 82, accordingly, the onboard power receiver 7 and the ground power feeder 24 can have large widths. Thereby it is possible to transmit a high electric power and as well to obtain a large gap between the ground power feeder 24 and the onboard power receiver 7. Thus, large allowances for variation in the height of the vehicle 1 and a positional shaft upon stopping of the vehicle can be obtained.

Embodiment 6

Figure 12:
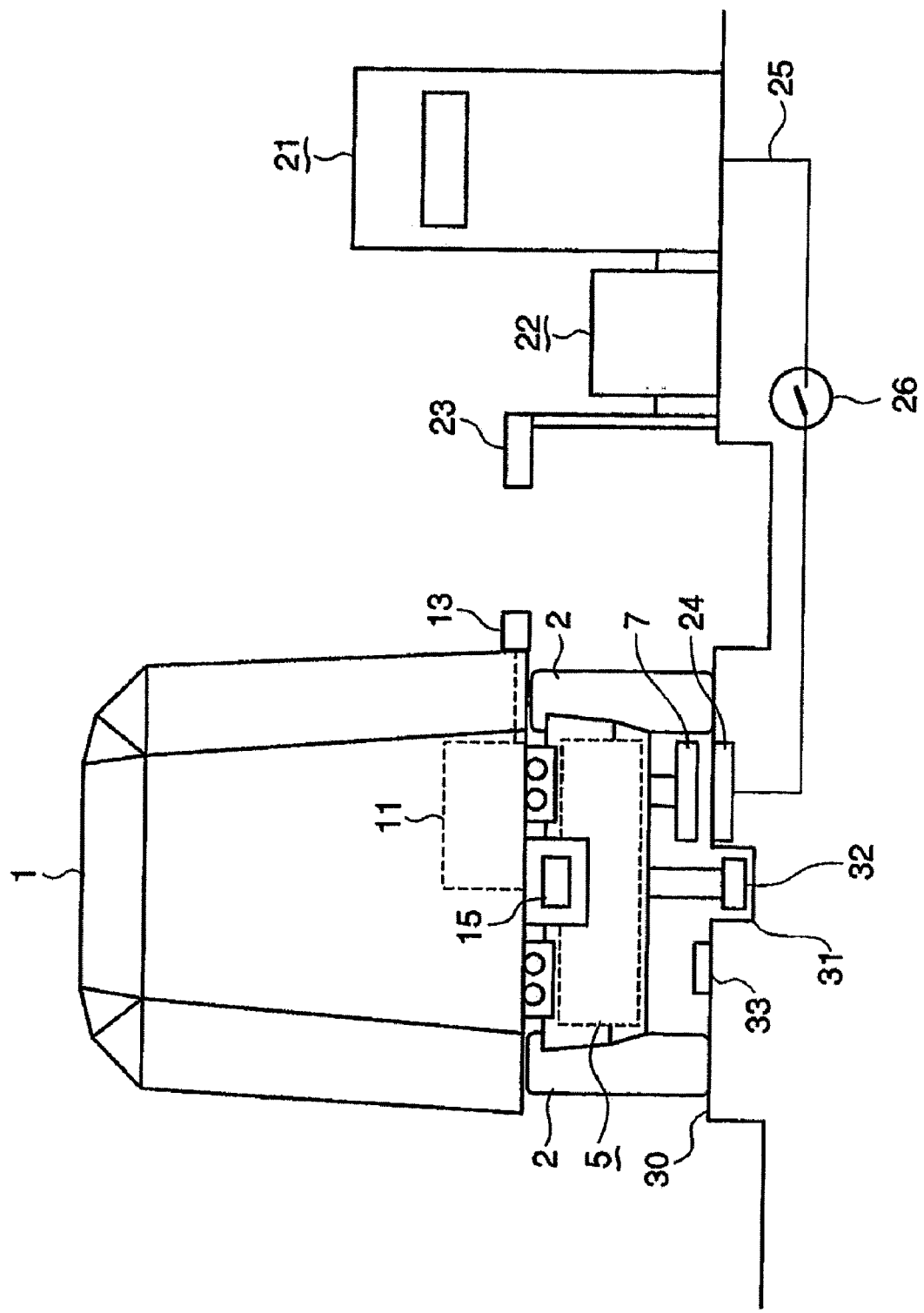
FIG. 12 is an elevation view illustrating a configuration of a sixth embodiment of the present invention.

Next, explanation will be made of a sixth embodiment of the present invention with reference to FIG. 12 which is an elevation view illustrating a configuration of a vehicle positioned in a charging place. Referring to FIG. 12, the configuration of this embodiment is the same as that of the first embodiment, except that the ground power feeder 24 is buried underground of the running road surface 30. It is noted in this embodiment that a plurality of onboard power receivers may be provided in the longitudinal direction of the vehicle while a plurality of ground power receivers 24 are set up along the running road surface 30. Further, this embodiment may also be applied to a vehicle having steel wheels and running on rails as explained in the fifth embodiment.

According to this embodiment in which ground power feeder 24 is buried underground of the running road surface 30, no protrusion is present, thereby it is possible to aim at protecting the ground power feeder 24. Further, since the position of the ground power feeder 24 is lower, the onboard power feeder 7 can be arranged at a lower position, and the space above the onboard power feeder 7 can be enlarged, thereby it is possible to effectively use the space.

Embodiment 7

Figure 5:
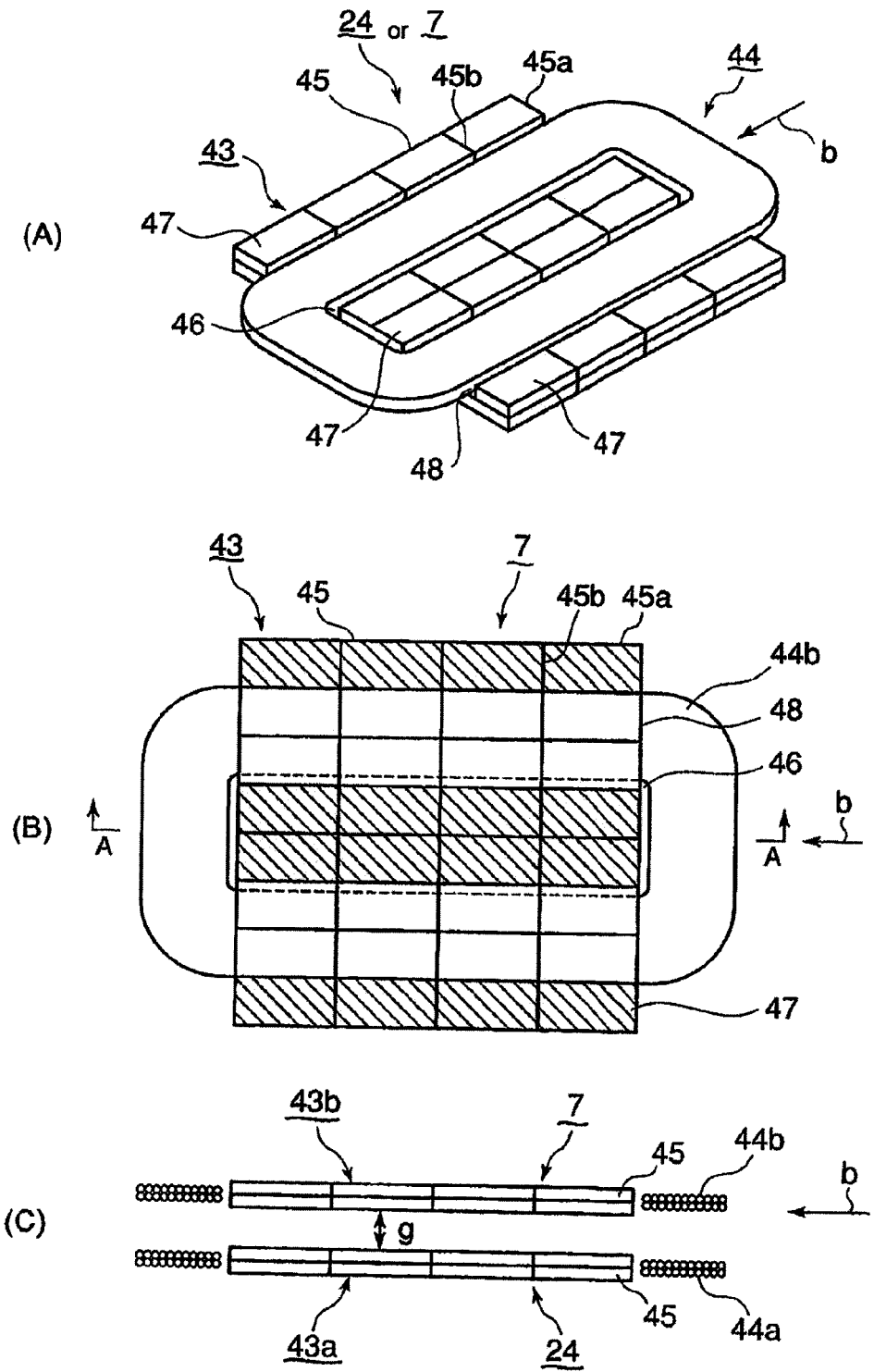
FIG. 5A is a perspective view illustrating a power feeder or a power receiver in the first embodiment.
FIG. 5B is a plan view illustrating a non-contact type power feeder system.
FIG. 5C is a sectional view along line A-A in FIG. 5B.
Figure 13:
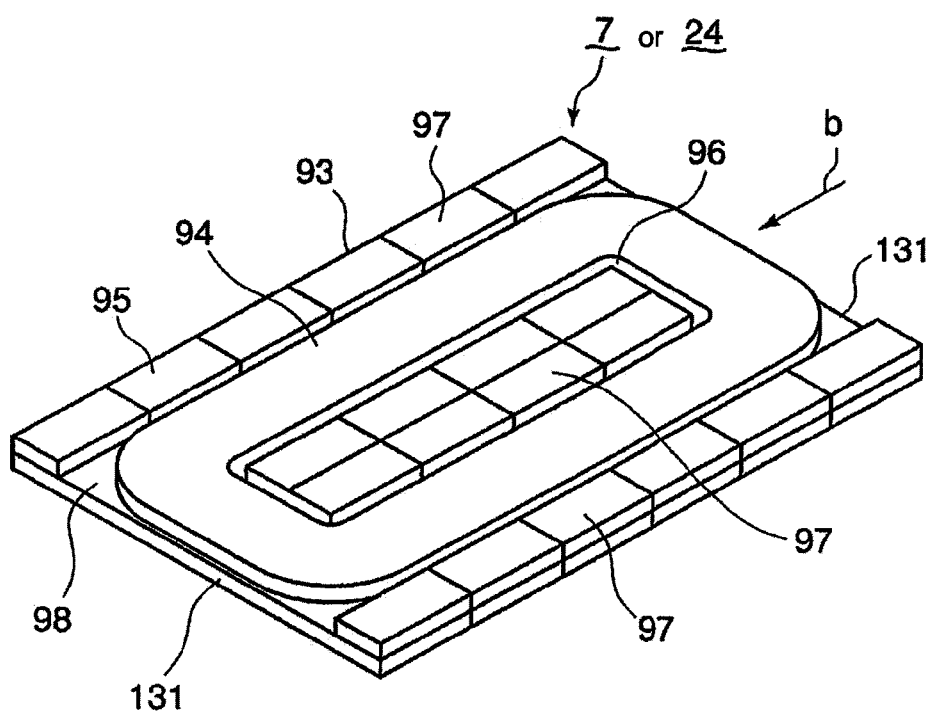
FIG. 13 is a perspective view illustrating a ground power feeder and an onboard power receiver in a seventh embodiment of the present invention.
Figure 14:
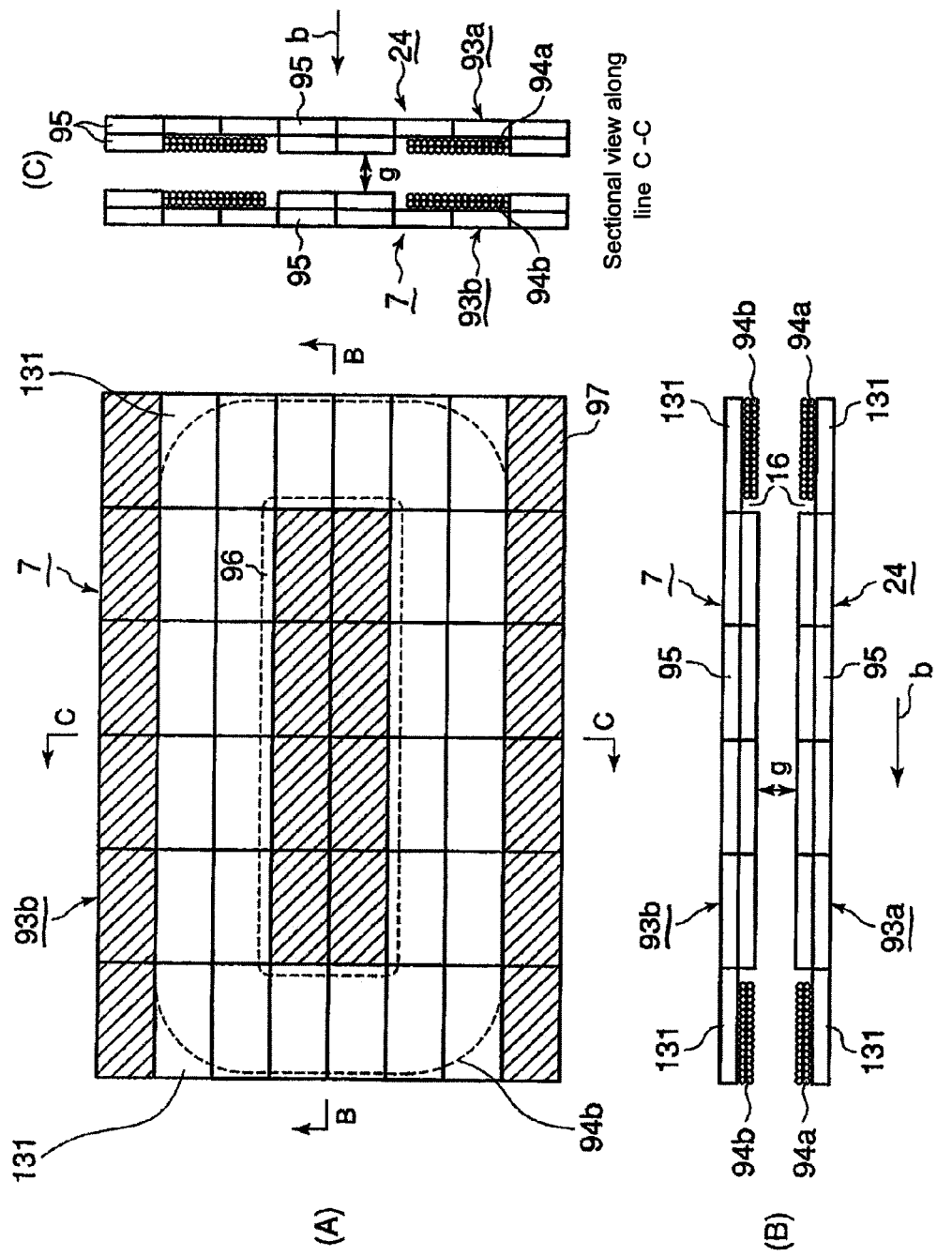
FIG. 14A is a plan view illustrating a non-contact type power feeder system in the seventh embodiment.
FIG. 14B is a sectional view along line B-B in FIG. 14A.
FIG. 14C is a sectional view along line C-C in FIG. 14A.
Figure 15:
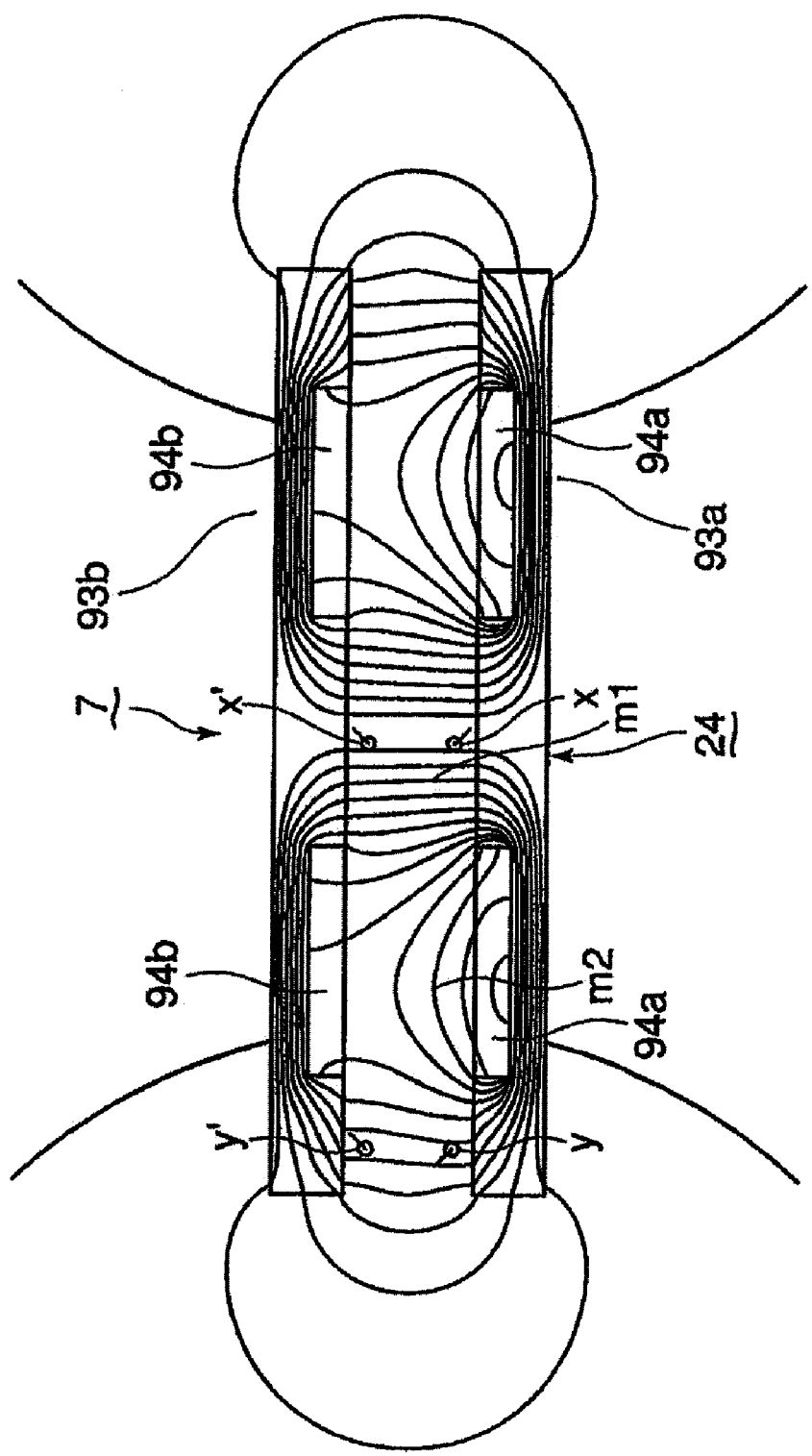
FIG. 15 is a chart illustrating magnetic flux lines applied to the non-contact type power feeder system in the seventh embodiment.
Figure 16:
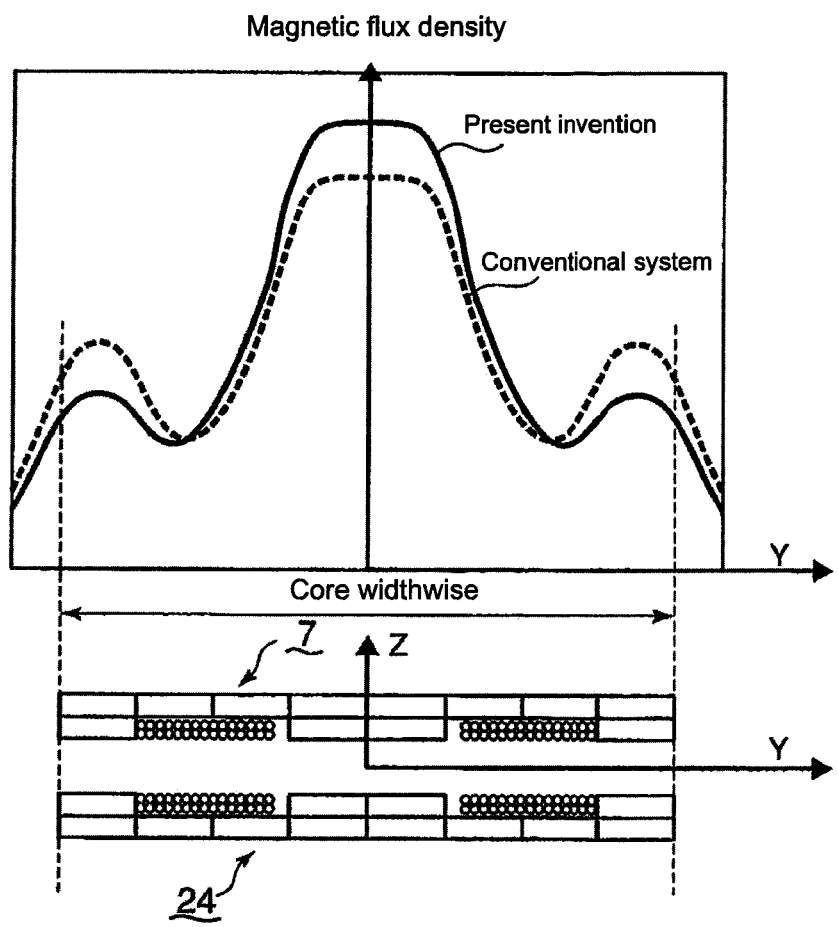
FIG. 16 is a chart illustrating core widthwise distributions of magnetic flux density in the system in the seventh embodiment and the conventional system.
Figure 17:
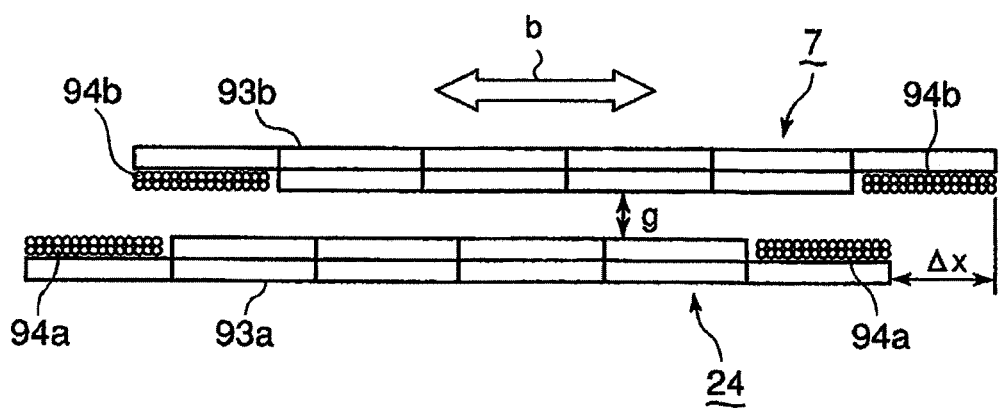
FIG. 17 is a view for explaining a horizontal positional shift of a vehicle in the seventh embodiment.

Explanation will be made of a seventh embodiment of the present invention with reference to FIGS. 13 to 17 in which FIG. 13 is a perspective view illustrating a ground power feeder 24 and an onboard power receiver 7, FIG. 14A is a plane view illustrating a noncontact type power feeder system in which the ground power feeder 24 and the onboard power receiver 7 are opposed face-to-face to each other in this embodiment, FIG. 14B is a sectional view along line B-B in FIG. 14A, and FIG. 14C is a sectional view along line C-C in FIG. 14C, FIG. 5 is a chart illustrating magnetic flux lines applied to the noncontact type power feeder system, FIG. 16 is a chart illustrating magnetic flux density distributions in the core widthwise direction of the power feeder systems in this embodiment and a conventional power feeder system, and FIG. 17 is a view for explaining a horizontal positional shift of a vehicle.

The configuration of this embodiment is the same as that of the first embodiment, except the configurations of the ground power feeder 24 and the onboard power receiver 7. Thus, explanation will be made of only the configurations of the ground power feeder 24 and the onboard power receiver 7, and explanation to the configurations of the other components will be omitted. Referring to FIG. 13, the configurations of the ground power feeder 24 and the onboard power receiver 7 are identical with each other, and they include of planar cores 93 which are composed in combination of several planar blocks 93 having the same dimensions and shapes as those of the planar blocks 45 in the first embodiment. A gap 96 is are provided with the same purpose as that of the gap 46. As shown in FIG. 14A, each of the ground power feeder 24 and the onboard power feeder 74 in this embodiment is composed of the planer blocks 95 in the number of 68 in total.

The shape of the planer core 93 is not E-like but has such a shape that U-like sectional shape parts 131 for supporting opposite end parts of windings 94, as viewed in the oval direction thereof, are added to both ends of an E-like core 43 similar to that in the first embodiment. The windings has an oval-like shape, similar to that in the first embodiment. The planer core 93 has a rectangular recess 98 with its long sides being extended in the travel direction b, for receiving the windings 94, and protrusions 97 (composed of two layers of the planar blocks 95) formed along the travel direction b on the outsides and inside of the recess 98. The windings 94 are accommodated in the recess 98 with its oval direction being directed in the travel direction b. With the addition of the U-like sectional shape parts 131, the planar core 93 has a support surface for supporting the windings over its entire periphery.

As shown in FIG. 14, the noncontact type power feeder system is configured in such a way that the ground power feeder 24 and the onboard power receiver 7 are arranged with their surfaces on the sides where the windings are accommodated being faced to each other, in parallel with each other with a gap g defined therebetween. FIG. 15 shows a magnetic flux lines applied to the noncontact type power feeder system. When a vehicle 1 which is not shown comes into and is stopped so as to oppose the onboard power receiver 7 to the ground power feeder 24 face-to-face, an AC current (a high frequency AC current in this case) is fed to primary windings 94$a$ in the ground power feeder 24, and accordingly, a magnetic flux is induced, having a main magnetic path through the gap g between the primary core 93$a$ and the secondary core 93$b$, as shown in FIG. 15.

The total magnetic flux is the sum of an effective magnetic flux m1 which interlinks the secondary windings 94 and a leakage magnetic flux m2 which dose not interlink the secondary windings 94$b$. Since the magnetic flux interlinking the secondary windings 94$b$ is changed with time, an induced electromotive force is induced in the secondary windings 94$b$ through electromagnetic induction, and accordingly, an AC current runs so that a high electric power is transmitted to a load connected to the secondary windings 94$b$.

As shown in FIG. 15, the distance between x–y (or between x'–Y') is set to be larger than the distance between x–x' in the widthwise direction of the primary core 93$a$ and the secondary core 93$b$ (a direction orthogonal to the travel direction b). That is, x–y (x'–y')/x–x'$\geq$1 is set so as to increase the magnetic resistance in a magnetic path which induces the leakage magnetic flux. Thus, the leakage magnetic flux can be reduced, and accordingly, the magnetic coupling rate can be increased, thereby it is possible to transmit a high electric power.

FIG. 16 is a chart which shows magnetic flux density distributions at the center of the gap g in the core widthwise direction of the conventional noncontact type power feeder system in this embodiment and a conventional noncontact type power feeder system in which a conventional E-like core is used, that is, FIG. 16 shows results of a three dimensional analysis for both magnetic flux density distributions in the core widthwise direction under the same winding current condition. In this embodiment, due to the addition of the U-like sectional shape parts 131 to the planer core 93 in each of the ground power feeder 24 and the onboard power receiver 7, the sectional areas of the protrusions 97 positioned outside of the recess 98 in which the windings 94 is accommodated are larger than those of the conventional E-like core, as viewed three-dimensionally. Accordingly, the magnetic flux density outside of the windings 94 is small as compared with the conventional one, and further, the overall magnetic resistance becomes smaller, resulting in an increase in inductance, since the U-like sectional shape cores are arranged in the magnetic path which has conventionally been an air space, thereby it is possible to increase the magnetic flux density in the inside of the windings 94.

Thus, according to this embodiment, since the inductance can be greater than the E-like core of the conventional one, a higher electric power can be transmitted, and further, since the magnetic flux density around each of the ground power feeder 24 and the onboard power receiver 7 can be decreased, thereby it is possible to restrain affections caused by electromagnetic noise and inductive overheating.

Further, in this embodiment, due to the provision of the U-like sectional shape parts 131, the magnetic flux can be readily created even in the end parts, and accordingly, the inductance is increased so as to enable transmission of a higher electric power.

Referring to FIG. 17 which is a view for explaining a horizontal positional shift of the mobile object, there would be possibly caused a horizontal positional shift Δx between the onboard power receiver 7 and the ground power feeder 24, that is, the onboard power receiver 7 is located at a position which is not right above the ground power feeder 24 when the vehicle 1 which is not shown comes in the travel direction b and is stopped at a position above the ground power feeder 24. However, even in this case, in this embodiment, each of the ground power feeder 24 and the onboard power receiver 7 is composed of the large-sized planar core 93 having a rectangular shape with the long sides thereof being extended in the travel direction b, and further, the magnetic coupling rate can be enhanced as stated above, thereby it is possible to obtain a relative large gap g. Thus, the inductance is not changed substantially even though a horizontal positional shift Δx is caused, and accordingly, a high electric power can be transmitted.

Thus, according to this embodiment in which the planar core 93 is composed of a plurality of planar cores 95 in combination, the large-sized planar core 93 can be simply manufactured at low costs. Further, even though the core width in the direction orthogonal to the travel direction b is narrow, the freedom of designing a high electric power transmission system can be increased by adjusting the core length in the travel direction b. Further, the magnetic coupling rate can be increased even though the gap g between the ground power feeder 24 and the onboard power receiver 7 can be set to be large. Further, it is possible to transmit a high electric power even though a horizontal positional shift Δx is caused between the ground power feeder 24 and the onboard power receiver 7.

Embodiment 8

Figure 18:
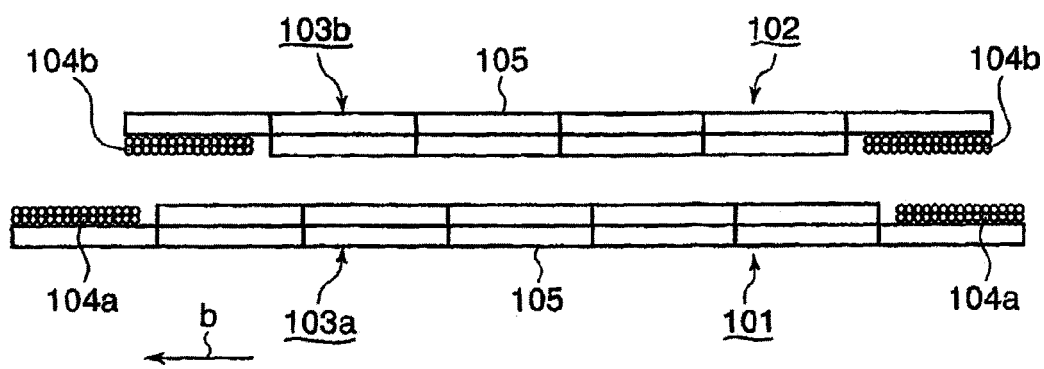
FIG. 18 is a sectional elevation view illustrating a non-contact type power feeder system in an eighth embodiment of the present invention.

Next, explanation will be made of an eighth embodiment of the present invention with reference to FIG. 18 which shows an elevation view illustrating a noncontact type power feeder system in the eighth embodiment. Referring to FIG. 18, in this embodiment, a ground power feeder 101 is added with the planer blocks so as to be longer in the travel direction b of the vehicle 1 than an onboard power receiver 102 by a length corresponding to one planar block. Thus, it is possible to enhance the robustness as to an electromotive force against a horizontal positional shift upon stopping of the vehicle.

Further, since the onboard power receiver 102 which is desired to be compact, is shorter in the travel direction b than the ground power feeder 101, thereby it is possible to make the onboard power receiver 102 compact.

Figure 19:
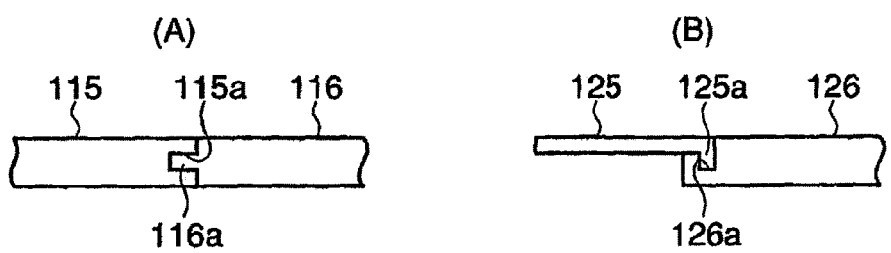
FIG. 19 is a view for explaining a structure in which planar blocks are joined to one another.

It is noted in a method of combining planar blocks 105 with one another so as to constitute the core of the ground power feeder 101 or the onboard power feeder 102, that they may be joined together by an adhesive or insulating bolts. However, they may be fitted together at their ends, as shown in FIGS. 19A and 19B. That is, in FIG. 19A, a recess 115a formed in one end part of a planar block 115 is closely fitted onto a protrusion 116a projected from one end part of a planer core 116 against which the planer block 115 abuts, so as to join both planar blocks 115, 116.

In FIG. 19B, a protrusion 125a projected downward from one end part of a planar block 125 is closely fitted in a recess 126a formed in one end part of a planar block 126 against which the planar block 125 abuts so as to join both planar blocks.

Figure 20:
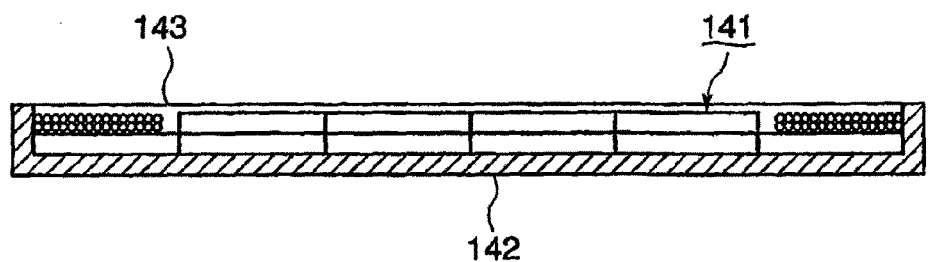
FIG. 20 is a longitudinally sectional elevation view illustrating a structure for a protecting a power feeder.

Further, in the case of setting up the ground power feeder 101 on the running road surface 30, should the ground power feeder 101 be exposed from the running road surface 30, the ground power feeder would be deteriorated by dust or any other external environment. Accordingly, it is necessary to set up the ground power feeder in a condition in which it is isolated from the external environment. FIG. 20 shows an example of the isolation. Referring to FIG. 20, a ground power feeder 141 is accommodated in a resin casing 142, and is then covered thereover with molten insulating resin which is thereafter solidified into an insulating resin coating 143. Thus, the ground power feeder 141 is isolated from the external environment, thereby it is possible to prevent lowering of its performance.

INDUSTRIAL APPLICABILITY

According to the present invention, there is provided a noncontact type power feeder system for feeding an electric power into a mobile object such as an electric car, including the ground power feeder and the onboard power receiver which can be readily manufactured at low costs, without provision of a drive mechanism, thereby it is possible to provide a power feeder system capable of performing a quick charge and transmitting a high electric power.

The invention claimed is:

1. A noncontact type power feeder system for a mobile object comprising a power feeder arranged along a running road surface for the mobile object, and a power receiver mounted to the mobile object for feeding an electric power between the power feeder and the power receiver which are opposed face-to-face each other, characterized in that:
    the power feeder is secured on the running road surface for the mobile object, the power feeder is secured at a position where the power receiver is opposed face-to-face to the power feeder with a predetermined gap therebetween when the mobile object is stopped at a position where the power feeder is set up,
    each of the power feeder and the power receiver is composed of a planar core having long sides extended in a travel direction of the mobile object,
    the power feeder is fed with an electric power through a power feed line laid underground,
    either one of the power feeder and the power receiver is movable toward and away from each other, and
    magnets are mounted to the upper surface of the power feeder which is accommodated in a recess formed in the running road surface and which is supported by resilient springs so that the power feeder is located below the running road surface by its dead weight when the mobile object does not approach the power feeder, but the power feeder is projected above the running road surface by an attraction force effected between the magnet and the mobile object when the mobile object approaches the power feeder.

2. A noncontact type power feeder system for a mobile object as set forth in claim 1, characterized in that the mobile object incorporates a position detecting sensor for the mobile object, and a control unit receiving positional data detected by the position detecting sensor for stopping the mobile object at a position where the power feeder and the power receiver are opposed face-to-face to each other.

3. A noncontact type power feeder system for a mobile object as set forth in claim 2, characterized in that wheel stoppers for stopping a vehicle wheel when the mobile object comes to a position where the power feeder and the power receiver are opposed face-to-face to each other are buried in the running road surface, and are adapted to be projected from the running road surface when the mobile object comes to the position where the power feeder and the power receiver are opposed face-to-face to each other.

4. A noncontact type power feeder system as set forth in claim 1, characterized in that each of the power feeder and the power receiver is composed of oval-like windings and a magnetic planar plate formed in its outer surface with a recess for accommodating the windings with the oval direction of the windings being extended along the travel direction of the mobile object,
the planar core is composed of a plurality of planar blocks which are arranged in the travel direction or a direction orthogonal to the travel direction, or superposed with one another up and down in a condition in which the long sides of the planer blocks are extended in the travel direction; and
the recess of the planar core is formed by the provision of thick wall parts in which the planar blocks are superposed with one another, on the outer surface of the planar core on the inside and the outside of the oval part of the windings.

5. A noncontact type power feeder system as set forth in claim 4, characterized in that the recess of the planar core, corresponding to the oval part of the windings is configured in such a way that a plurality of planar blocks having rectangular surfaces are arranged in the travel direction or a direction orthogonal to the travel direction in a condition in which the rectangular long sides of the planar cores are extended in the travel direction, and the thick wall parts located on the inside and the outside of the oval part are formed by superposing the planar blocks with one another up and down.

6. A noncontact type power feeder system as set forth in claim 4, characterized in that the planar core is provided with U-like sectional shape parts for supporting opposite ends of the windings in the oval direction so as to allow the planer core to support the windings over its entire periphery.

7. A noncontact type power feeder system for a mobile object as set forth in claim 6, wherein each of the U-like sectional shape parts is flattened hightwise, with its bottom extending in the direction of the short sides as viewed in the oval direction.

8. A noncontact type power feeder system for a mobile object as set forth in claim 6, characterized in that each of the U-like sectional shape parts for supporting the opposite end parts of the windings in the oval direction of the windings, on the planar core, has such a sectional structure that embankment-like wall thick parts are present on opposite sides of the recess in which the windings are accommodated, as viewed in the short side direction of the recess.

9. A noncontact type power feeder system for a mobile object as set forth in claim 4, characterized in that the recess of the planar core has an opening width which is set to be equal to or larger than the gap between the power feeder and the power receiver.

10. A noncontact type power feeder system for a mobile object as set forth in claim 1, characterized in that the power feeder has a length in the travel direction, which is longer than that of the power receiver.

* * * * *